US012744368B2

(12) United States Patent
Wang et al.

(10) Patent No.: US 12,744,368 B2
(45) Date of Patent: Sep. 22, 2026

(54) ASSEMBLIES FOR MOUNTING ANTENNA CABLES

(71) Applicant: Outdoor Wireless Networks LLC, Claremont, NC (US)

(72) Inventors: Jiayong Wang, Shanghai (CN); Matthew Severin, Grapevine, TX (US); Charles John Mann, Omaha, NE (US); ZhaoHui Liu, Suzhou (CN); Bin Ai, Suzhou (CN); Jian Xu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 282 days.

(21) Appl. No.: 18/355,830

(22) Filed: Jul. 20, 2023

(65) Prior Publication Data

US 2024/0039264 A1 Feb. 1, 2024

Related U.S. Application Data

(60) Provisional application No. 63/369,581, filed on Jul. 27, 2022.

(51) Int. Cl.

*H02G 3/32* (2006.01)
*H01Q 1/12* (2006.01)
*H01Q 1/24* (2006.01)

(52) U.S. Cl.

CPC ............. *H02G 3/32* (2013.01); *H01Q 1/1228* (2013.01); *H01Q 1/246* (2013.01)

(58) Field of Classification Search

CPC ........ H02G 3/32; H01Q 1/1228; H01Q 1/246; H01Q 1/12

See application file for complete search history.

(56) References Cited

U.S. PATENT DOCUMENTS 9,812,762 B2 11/2017 Skrepcinski et al.
10,158,218 B2 12/2018 Vaccaro et al.
(Continued)

FOREIGN PATENT DOCUMENTS

KR 20160119402 A 10/2016
KR 101885040 B1 8/2018
KR 102145150 B1 8/2020

OTHER PUBLICATIONS

International Search Report and Written Opinion corresponding to PCT/US2023/070548; Mailed: Nov. 13, 2023, (10 pages).
(Continued)

*Primary Examiner* — Tulsidas C Patel
(74) *Attorney, Agent, or Firm* — Myers Bigel, P.A.

(57) ABSTRACT

A cable mounting kit includes: first and second clamps, the first clamp including a first securing feature configured to engage a second securing feature on the second clamp to enable the first and second clamps to enclose and mount on a mounting structure, each of the first and second clamps including a clamping surface configured to engage the mounting structure and an opposed outer surface with a pair of first mounting holes; at least one hanger panel, the hanger panel having a plurality of second mounting holes on an outer surface thereof and a first pair of latches, the hanger panel being mounted to the first clamp; and at least one adapter extension, the adapter extension comprising a base having a second pair of latches, a shaft extending from the base, and a head with a pair of third mounting holes.

34 Claims, 19 Drawing Sheets

(56) References Cited

U.S. PATENT DOCUMENTS

| | | | | |
|---|---|---|---|---|
| 10,637,226 | B2 | 4/2020 | Bell et al. | |
| 10,801,646 | B2 | 10/2020 | Vaccaro | |
| 11,004,367 | B2 | 5/2021 | Vaccaro et al. | |
| 11,159,006 | B2 | 10/2021 | Heath et al. | |
| 2011/0074652 | A1* | 3/2011 | Lewry | H01Q 1/125 343/882 |
| 2018/0045336 | A1* | 2/2018 | Vaccaro | H02G 3/32 |
| 2019/0353292 | A1 | 11/2019 | Van Beugen et al. | |
| 2020/0119537 | A1* | 4/2020 | Heath | H01Q 1/1242 |
| 2021/0135352 | A1 | 5/2021 | Bell et al. | |
| 2021/0190237 | A1 | 6/2021 | Bell et al. | |
| 2022/0037758 | A1 | 2/2022 | Kim et al. | |
| 2022/0316622 | A1 | 10/2022 | Joshi et al. | |
| 2022/0352626 | A1* | 11/2022 | Ragos | H01Q 1/246 |

OTHER PUBLICATIONS

"Extended European Search Report corresponding to European Application No. 23947463.9 dated Mar. 9, 2026".

* cited by examiner 20
20
14

20
60

20
20
60
20
40
20

20
60
60
20

20
60
40
20
60
40

33
30
26
32
24

24
31
32
30
28
28

22
20
24
30
30
26
33

30
26
26
33
32
31

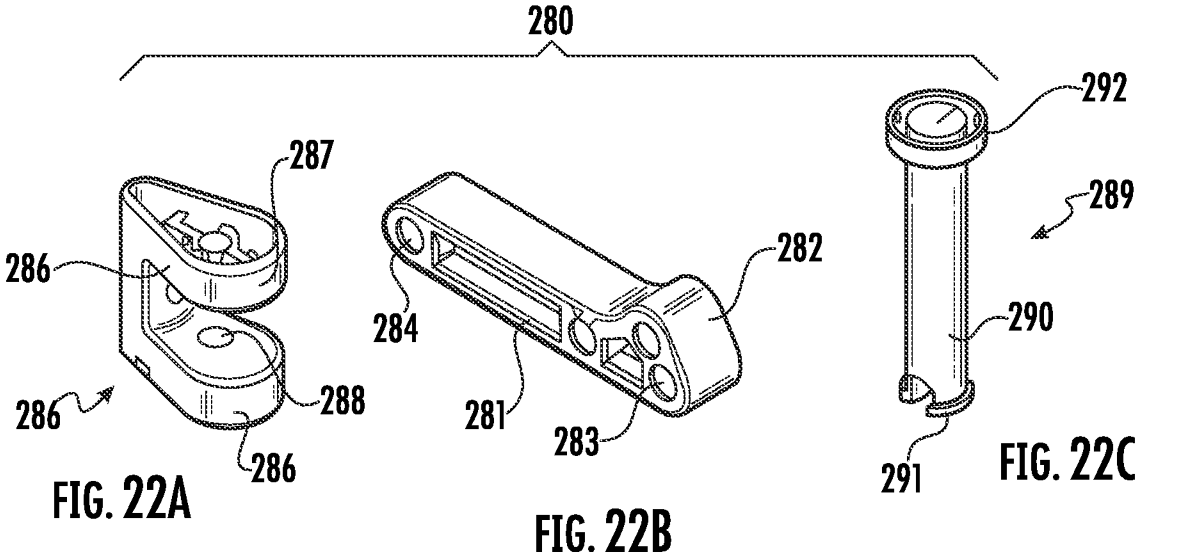
FIG. 22A
FIG. 22B
FIG. 22C
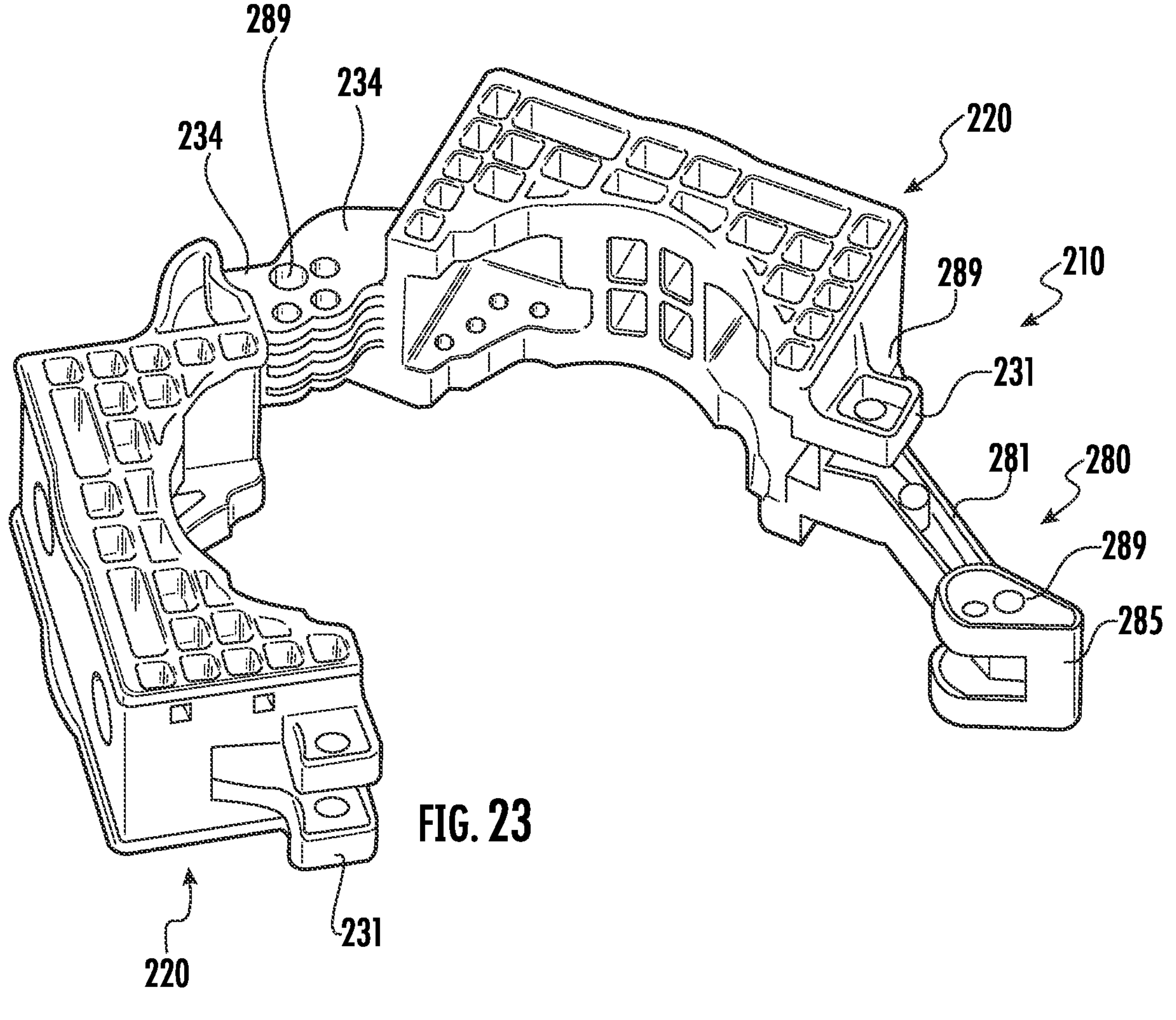
FIG. 23

ASSEMBLIES FOR MOUNTING ANTENNA CABLES

RELATED APPLICATION

The present application claims priority from and the benefit of U.S. Provisional Patent Application No. 63/369,581, filed Jul. 27, 2022, the disclosure of which is hereby incorporated herein by reference in full.

FIELD OF THE INVENTION

The present invention relates generally to mounts for antennas, radios and cables, and more particularly to mounts for antennas, radios and cables on an antenna tower or monopole.

BACKGROUND OF THE INVENTION

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

Antennas typically mount to a round pipe; an exemplary mount with round vertical pipes for antenna mounting is shown in U.S. Pat. No. 9,812,762 to Skrepcinski, the disclosure of which is hereby incorporated herein in its entirety). When mounting antennas to towers or other structures, the cables attaching the radio to the antenna typically protrude from the bottom of the antenna for some unsupported length. It is typically desirable to secure these cables to maintain a sense of organization and to prevent swaying in the wind. A system of cable support brackets is commonly used to hold these cables in place. Those cable support systems usually also mount to the same pipe to which the antenna is mounted, and include two half-clamps that are joined with bolts that extend on either side of the pipe. The front plane of one of the half-clamps is parallel to the face of the antenna. Additional brackets are then bolted onto the front half-clamp. Additional support may be needed behind the antenna when the radio is not mounted in close proximity to the antenna and from the radio to an overvoltage protection unit, which is typically mounted in a central position on the mount to feed up to 6 radios.

Areas near cellular antennas (i.e., within 1λ, or one wavelength) can be (relatively) high radio frequency (RF) energy environments. Conductive items in these areas, such as hangers, brackets and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions for hanging cables with reduced (or eliminated) likelihood of PIM generation.

One approach is offered in U.S. Pat. No. 11,159,006 to Heath et al., the disclosure of which is hereby incorporated herein by reference in full. The approach discussed therein features an assembly that includes: a pair of L-shaped members, each of the L-shaped members including a main panel, a pair of jaws extending from opposite edges of the main panel, and a flange extending generally perpendicularly to the main panel. The main panel includes a plurality of first mounting apertures and the flange includes a plurality of second mounting apertures. Each of a pair of rods extends through a first mounting aperture of each of the L-shaped members; and a securing component that engages each rod to fix the members relative to each other so that the jaws are mounted to a mounting pole. Cable hangers can then be mounted in the second mounting apertures on the flange to provide organization for cables connecting an antenna mounted on the mounting pole. This is a popular solution, but it may be desirable to provide additional solutions that can increase flexibility and/or reduce PIM.

SUMMARY OF THE INVENTION

As a first aspect, embodiments of the invention are directed to an assembly for providing mounting locations for cable hangers for an antenna. The assembly comprises: first and second clamps, the first clamp including a first securing feature that engages a second securing feature on the second clamp to enable the first and second clamps to enclose and mount on a mounting structure, each of the first and second clamps including a clamping surface configured to engage the mounting structure and an opposed outer surface with a pair of first mounting holes. The first and second clamps comprise a polymeric material.

As a second aspect, embodiments of the invention are directed to a cable mounting kit comprising: first and second clamps, the first clamp including a first securing feature configured to engage a second securing feature on the second clamp to enable the first and second clamps to enclose and mount on a mounting structure, each of the first and second clamps including a clamping surface configured to engage the mounting structure and an opposed outer surface with a pair of first mounting openings; and at least one cable hanger mounting component selected from: a hanger panel, the hanger panel having a first plurality of cable hanger mounting holes on an outer surface thereof and a first pair of latches, the first pair of latches being receivable within the first mounting openings; at least one adapter extension, the adapter extension comprising a base having a second pair of latches being receivable within the first mounting openings, a member extending from the base, and a head with a pair of second mounting openings; and a mounting adapter having a third set of latches receivable within the first mounting openings or the second mounting openings, the mounting adapter including at least one second cable hanger mounting hole; wherein the first pair of latches is also receivable within the second mounting openings.

BRIEF DESCRIPTION OF THE FIGURES

FIG. 6 shows one hanger panel of FIG. 4 mounted directly to one of the clamps, FIG. 7 shows one hanger panel of FIG. 4 mounted to a clamp via an adapter extension of FIG. 3, FIG. 8 shows two hanger panels of FIG. 4 mounted directly to the clamps, and FIG. 9 shows two hanger panels of FIG. 4 mounted to the clamps via adapter extensions of FIG. 3.

FIGS. 22A-22C are perspective views of a latch lever, a latch link, and a latch pin used to secure the assembly of FIG. 20.

FIG. 23 is a perspective view of the assembly of FIG. 20 showing how the components of FIGS. 22A-22C are employed to secure the clamps of FIG. 20.

DETAILED DESCRIPTION OF THE INVENTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
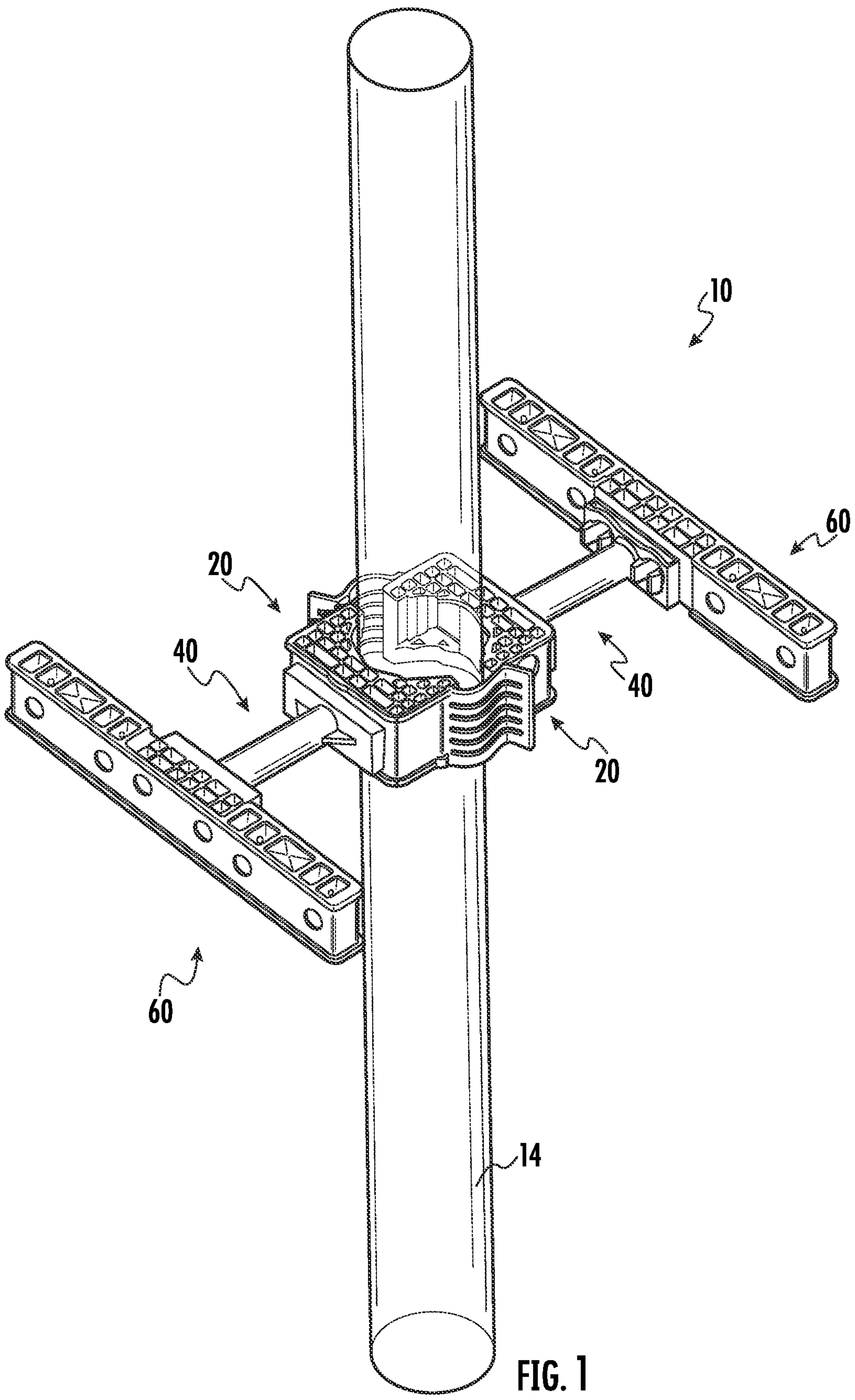
FIG. 1 is a perspective view of an assembly according to embodiments of the invention mounted on a mounting pole.

Referring now to the drawings, an assembly for mounting antenna cables is shown in FIG. 1 and designated broadly therein at 10. The assembly 10 includes two clamps 20, two adapter extensions 40, and two hanger panels 60, which are then mounted on a mounting pole 14. These components are described in greater detail below.

Figure 2:
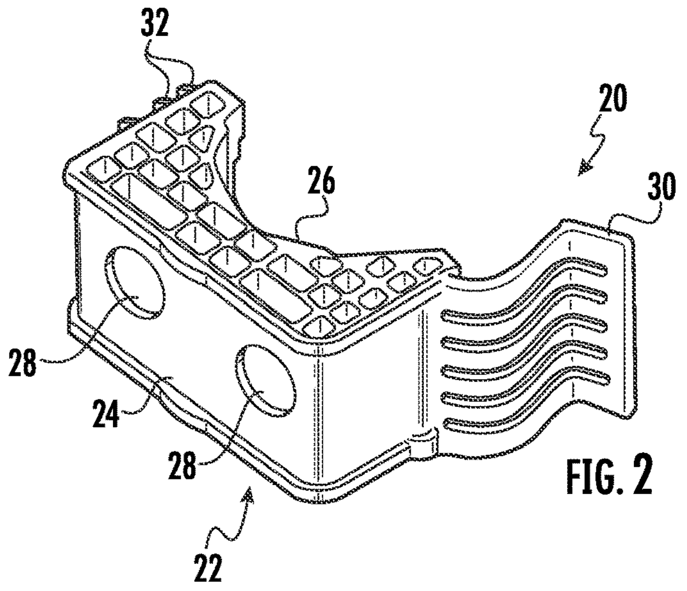
FIG. 2 is a perspective view of one of the clamps of the assembly of FIG. 1.

Referring now to FIG. 2, one of the clamps 20 is shown therein. The clamp 20 includes a skeletal body 22 with a generally flat outer surface 24 and arcuate clamping surfaces 26 opposite the outer surface 24. Two mounting holes 28 (typically with a ¾ inch nominal diameter) are located in the outer surface 24. A generally S-shaped latch 30 extends from one end of the body 22. A plurality of fingers 32 extend from the opposite end of the body 22 (see FIGS. 13A-13C). The latch 30 and fingers 32 are configured to secure two clamps 20 around a mounting pole 14; details regarding the latch 30 and fingers 32 and how they secure the clamps 20 are provided below in connection with the discussion of FIGS. 13A-13C and 14.

Figure 3:
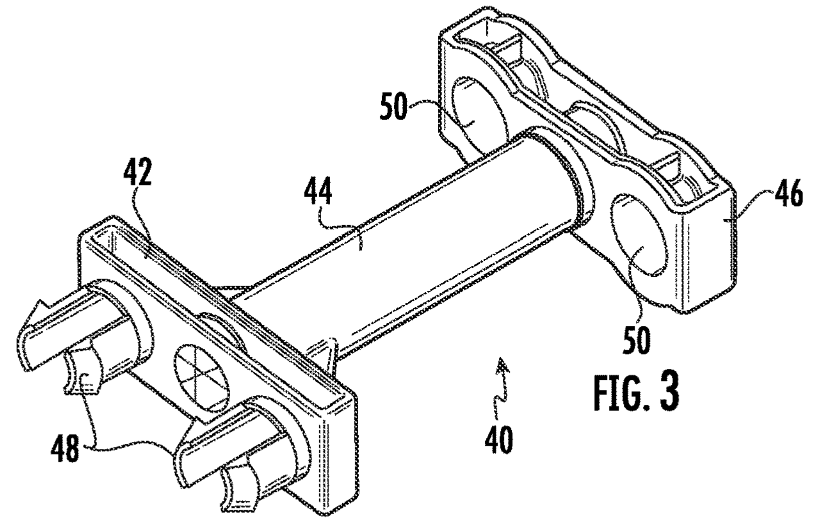
FIG. 3 is a perspective view of one of the adapter extensions of the assembly of FIG. 1.

Referring now to FIG. 3, one of the adapter extensions 40 is shown therein. The adapter extension 40 includes a base 42, a shaft 44 that is fixed to the base 42 and extends generally normal thereto, and a head 46 that is fixed to the base and is generally parallel with the base 42. Two snap-fit latches 48 are mounted to the base 42 opposite the shaft 44, and are sized and positioned to fit within the mounting holes 28 of the clamp 20. Two mounting holes 50 are located in the head 46 and are sized and spaced similarly to the mounting holes 28.

Figure 4:
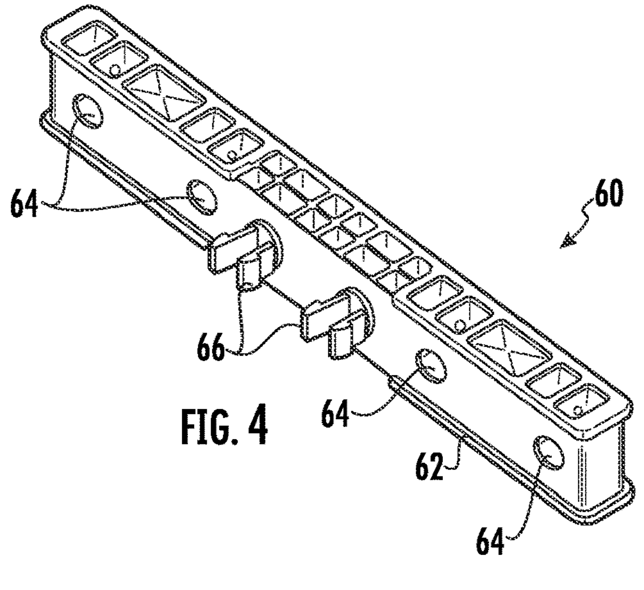
FIG. 4 is a perspective view of one of the hanger panels of the assembly of FIG. 1.

Referring now to FIG. 4, the hanger panel 60 has a generally rectangular skeletal base 62. Four mounting holes 64 (typically having a nominal diameter of ¾ inch) are spaced across the front surface of the base 42. Two snap-fit latches 66 extend from the rear surface of the base 62; the latches 66 are sized and positioned to fit within the mounting holes 50 of the adapter extension 40 or the mounting holes 28 in the clamp 20.

In some embodiments, all of the clamps 20, adapter extensions 40 and hanger panels 60 comprise a polymeric material. When so formed, none of the joints or connections between these components includes a metal-to-metal contact surface, such that no PIM is generated at these joints/connections.

Figure 5:
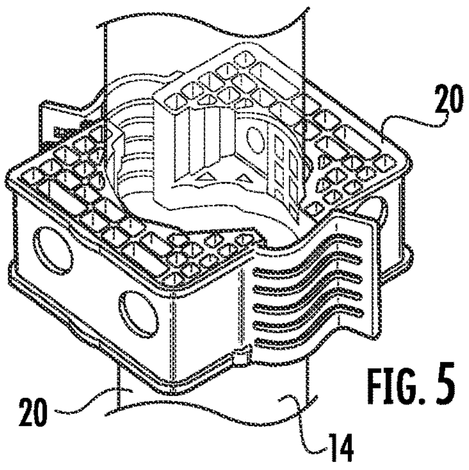
FIG. 5 is a perspective view of the clamps of the assembly of FIG. 1 mounted on the mounting pole.

As can be seen in FIGS. 5-9, these components can be employed in various combinations to provide mounting locations for cable hangers, which are in turn used to grasp and assist in organizing cables near an antenna. FIG. 5 illustrates two clamps 20 fastened together and mounted on a mounting pole 14. In this configuration, cable hangers (shown in FIG. 10 at 80) are mounted in the mounting holes 28 in the clamps 20. Because the cable hangers 80 are stackable on each other, a large number of cables can be grasped and organized in a small area. Such stackable cable hangers are well-known in this field, and are described in, for example, U.S. Pat. No. 10,158,218 to Vaccaro et al.; U.S. Pat. No. 11,004,367 to Vaccaro et al.; and U.S. Pat. No. 10,801,646 to Vaccaro; and co-pending and co-assigned U.S. Patent Publication No. 2022/0316622 (U.S. patent application Ser. No. 17/577,570) to Joshi et al., each of which is incorporated herein by reference in full.

Figure 6:
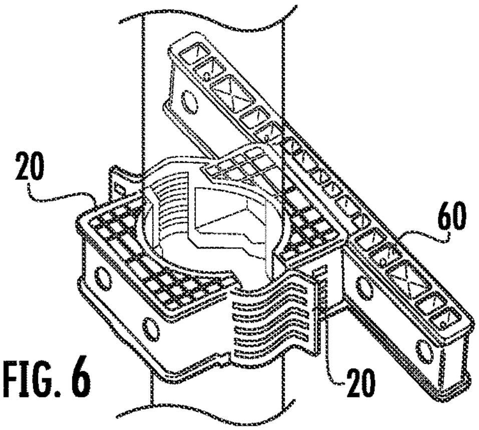
FIGS. 6-9 are perspective views of different configurations the components of the assembly of FIG. 1 may take.
Figure 8:
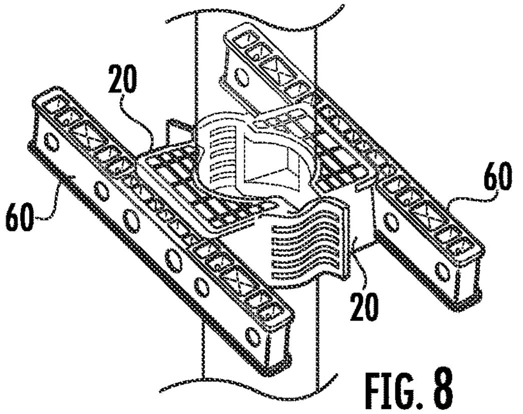
Figure 11:
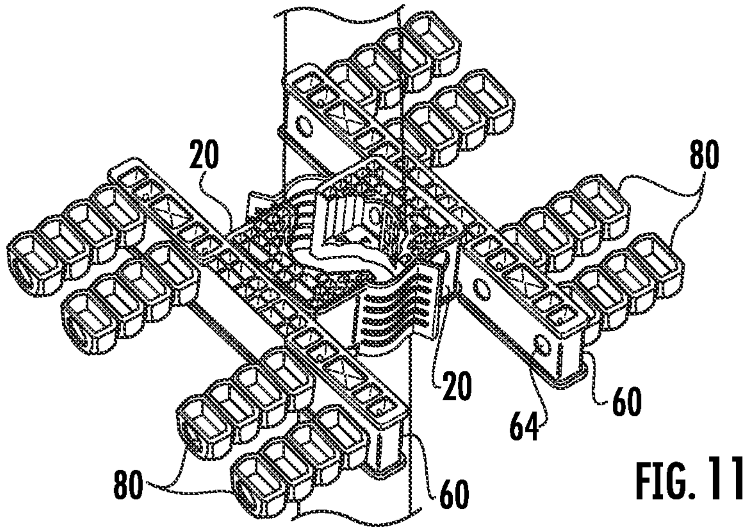

An alternative configuration is shown in FIG. 6, wherein one hanger panel 60 is mounted directly to one of the clamps 20 via the insertion of snap-fit latches 66 of the hanger panel 60 into mounting holes 28 of the clamp 20. FIG. 8 shows a configuration with two hanger panels 60, with one hanger panel 60 mounted to each of the clamps 20. FIG. 11 illustrates stacks of cable hangers 80 mounted in each of the mounting holes 64 of the hanger panels 60.

Figure 7:
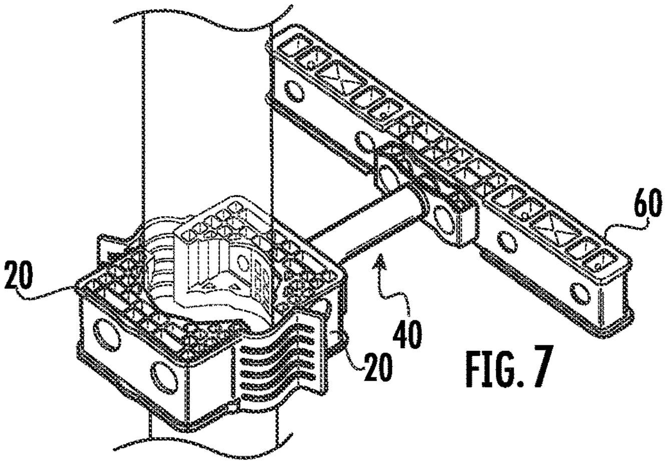
Figure 9:
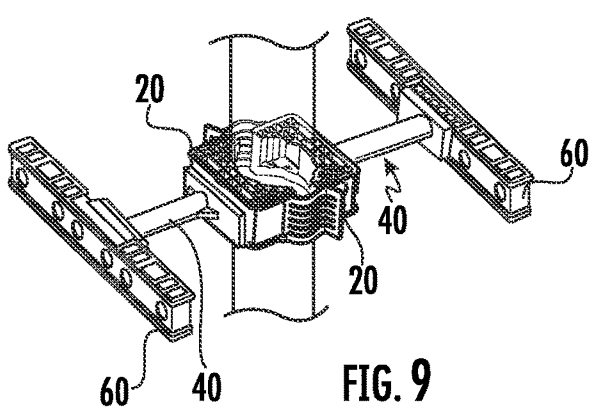
Figure 12:
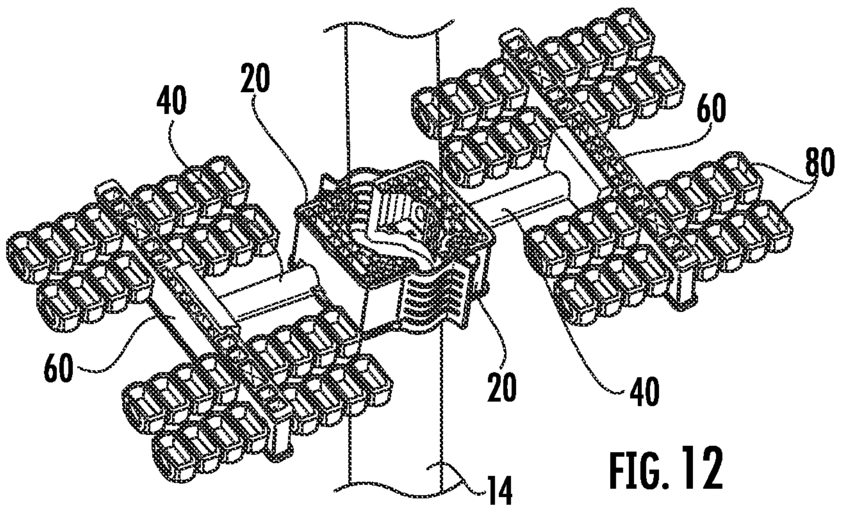

Another alternative configuration is shown in FIG. 7, wherein one adapter extension 40 is mounted via the snap-fit latches 48 in the mounting holes 28 of one of the clamps 20, and one hanger panel 60 is mounted via the snap-fit latches 66 in the mounting holes 50 of the adapter extension 50. FIG. 9 shows a configuration like that of FIG. 7, but with two sets of adapter extensions 40 and hanger panels 60 mounted to the clamps 20 (this arrangement is also shown in FIG. 1). FIG. 12 illustrates stacks of cable hangers 80 mounted in the mounting holes 64 of the hanger panels 60.

The configuration if FIGS. 9 and 12 can also provide an advantage when used to mount and organize fiber optic cable. Fiber optic cable typically has a minimum bend radius, which refers to a bend radius below which the cable should not be bent in order to avoid damage to the optical fibers. The length of the adapter extensions may be selected so that the hanger panels 60 are separated by a distance that enables fiber optic cables to be mounted thereon without reaching the minimum bend radius. As an example, the hanger panels 60 may be separated by at least 10 inches, and in some instance 12 inches or even 14 inches, to avoid minimum bend radius concerns.

Thus, it can be seen that the collection of clamps 20, adapter extensions 40 and hanger panels 60 can provide a technician with numerous ways to mount cable hangers 80, and can do so while eliminating PIM that might be generated by metal-on-metal contact surfaces.

Figure 13A:
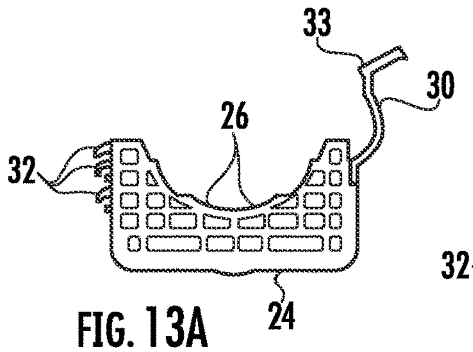
FIGS. 13A-13C are top, front and perspective views of the clamp of FIG. 2.
Figure 13B:
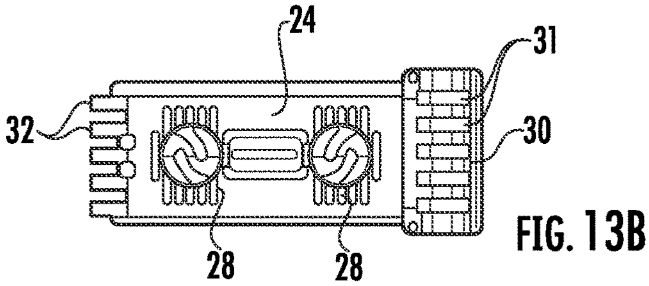
Figure 13C:
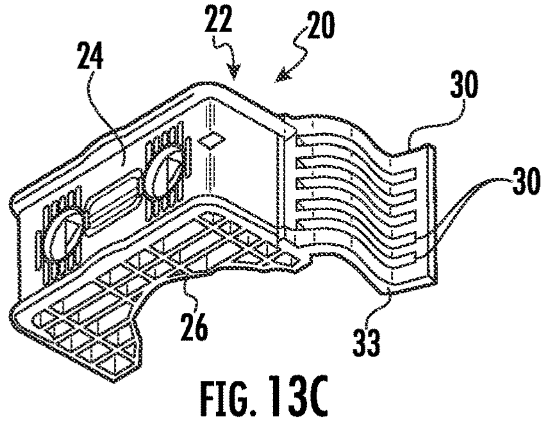

As described above, the clamps 20 are configured so that they can be secured to each other in order to mount on a mounting pole 14. FIGS. 13A-13C illustrate one clamp 20 in more detail. As can be seen in these figures, the aforementioned latch 30 is generally S-shaped and includes five slots 31 along its length. A rib 33 extends across the width of the latch 30 on its inboard surface. On the opposite side of the body 22 of the clamp 20, the fingers 32 are arranged in three rows, with each row having five fingers 32. When two clamps 20 are brought together for securing to a mounting pole 14, the fingers 32 of one clamp 20 are received in the slots 31 in the latch 30 of the other clamp 20. The fingers 32 are hooked, such that they engage and capture the rib 33 of the latch 31. Because there are multiple rows of fingers 32 on each clamp 20, a technician can select the row of fingers 32 that enables the clamps 20 be securely fastened for the mounting pole 14 within a relatively broad range of diameters.

Figure 14:
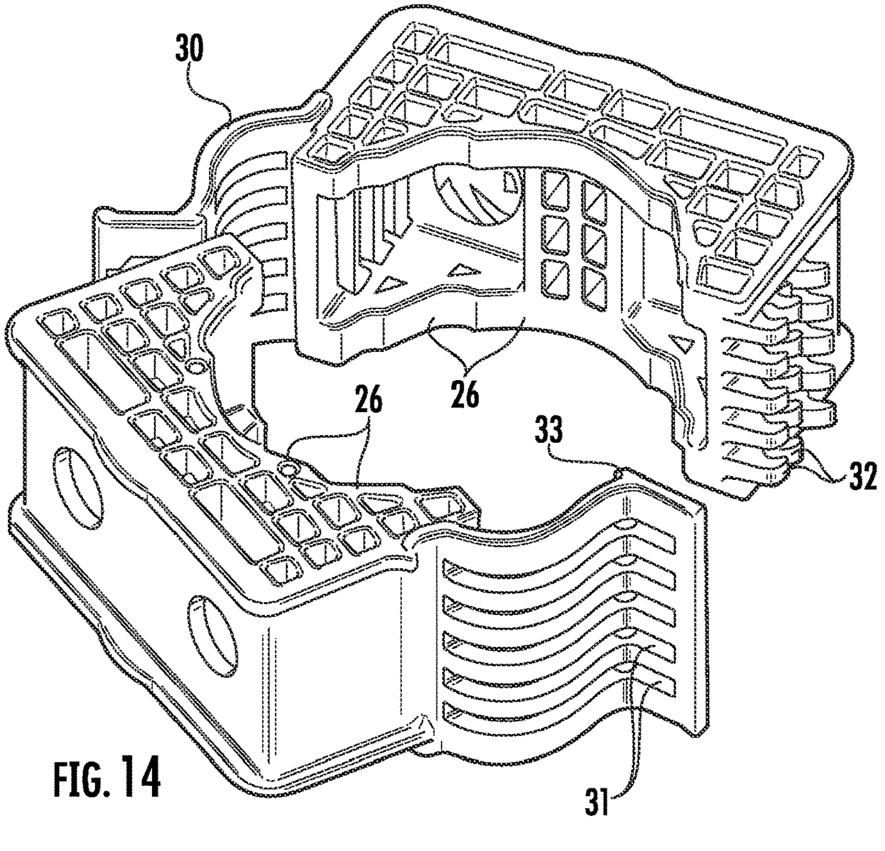
FIG. 14 is a perspective view of two clamps of FIGS. 13A-13C illustrating how the clamps are secured together.
Figure 15:
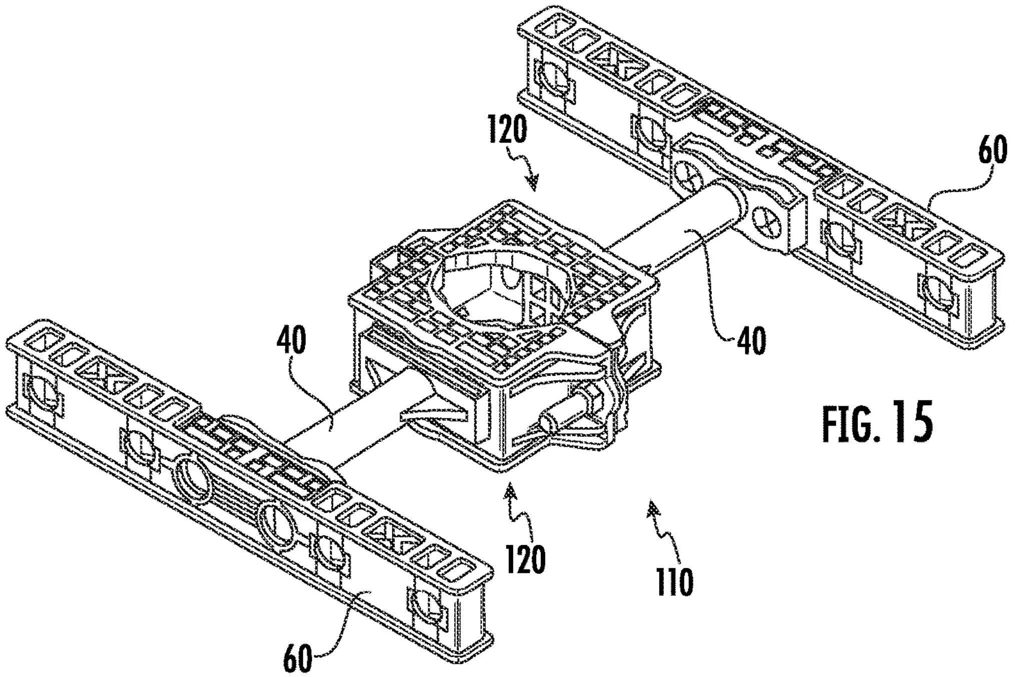
FIG. 15 is a perspective view of an assembly according to alternative embodiments of the invention.
Figure 16A:
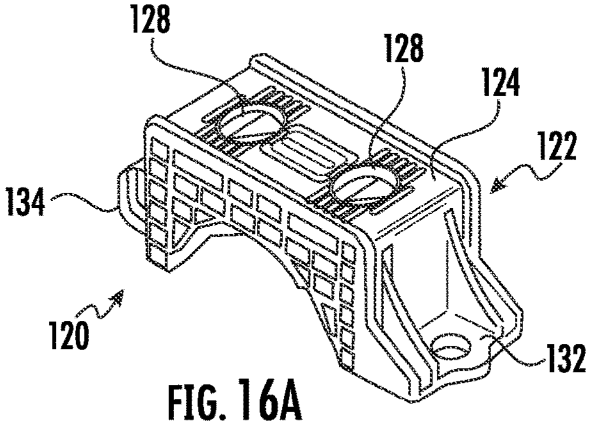
FIGS. 16A-16D are perspective views of one of the clamps of the assembly of FIG.
Figure 16B:
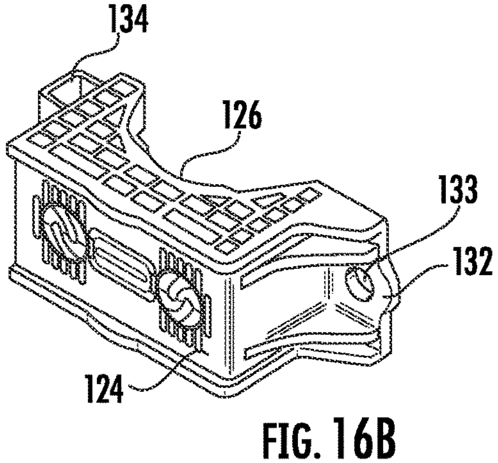
Figure 16C:
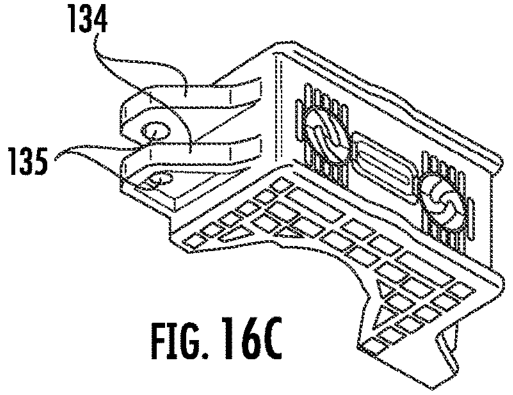
Figure 16D:
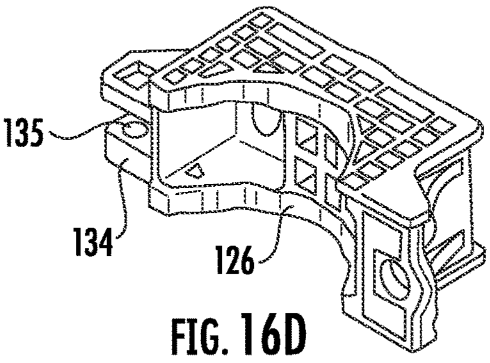

It can also be seen in FIGS. 13A and 14 that the clamping surfaces 26 of each clamp 20 are not smoothly continuous, but instead comprise multiple arced segments. The presence of these segments can enable the clamps 20 to be secured tightly to mounting poles 14 of different diameters.

Referring now to FIGS. 15-19, another assembly, designated broadly at 110, is shown therein. The assembly 110 includes adapter extensions 40 and hanger panels 60 like those of the assembly 10, but utilizes clamps 120 that are configured to be secured together differently than the clamps 20. As shown in FIGS. 16A-16D, each clamp 120 has a body 122, an outer surface 124 with mounting holes 128, and clamp surfaces 126 like the clamp 20. However, on one side of the body 122 the clamp 120 has a platform 132 with a mounting hole 133, and on the opposite side of the body 122 the clamp 120 has two gussets 134 with mounting holes 135.

Figure 17:
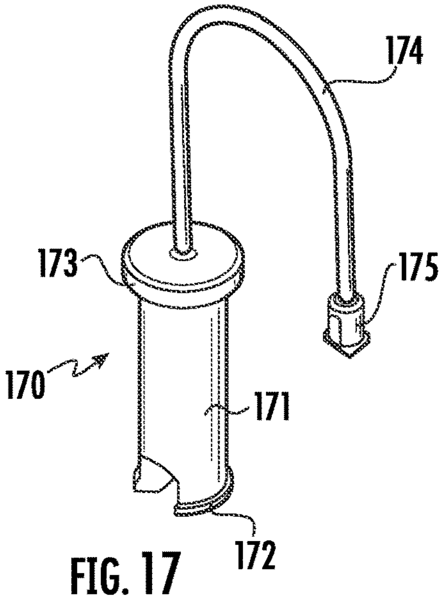
FIG. 17 is a clamp pin used to secure the clamp members of the assembly of FIG. 15.

The clamps 120 are secured with a clamp pin 170 and an eye bolt 176. As shown in FIG. 17, a clamp pin 170 has a body 171 with hooks 172 at its lower end, a collar 173 at the upper end of the body 171, and a tether 174 that extends from the collar 173 and has a clip 175 at its free end. The eye bolt 176 (FIG. 18) has a threaded shaft 177, a hex nut 178, and a head 179 with an eye 179*a*.

To connect the clamps 120, the shaft 177 of the eye bolt 176 is inserted into the mounting hole 133 in the platform 132 of one clamp 120, and the nut 178 is rotated onto the shaft 177. The head 179 is positioned between the gussets 134 of the other clamp 120, and the body 171 of the clamp pin 170 is inserted through both mounting holes 135 in the gussets 134 and through the eye 179*a*. The hooks 172 and the collar 173 on the clamp pin 170 maintain the clamp pin 170 in place.

Figure 18:
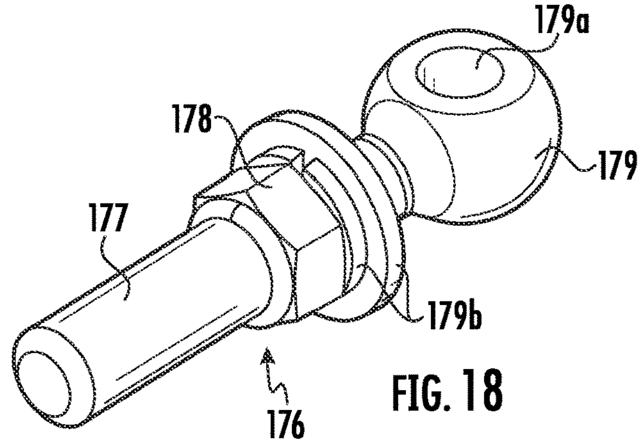
FIG. 18 is an eye bolt used to secure the clamp members of the assembly of FIG. 15.
Figure 19:
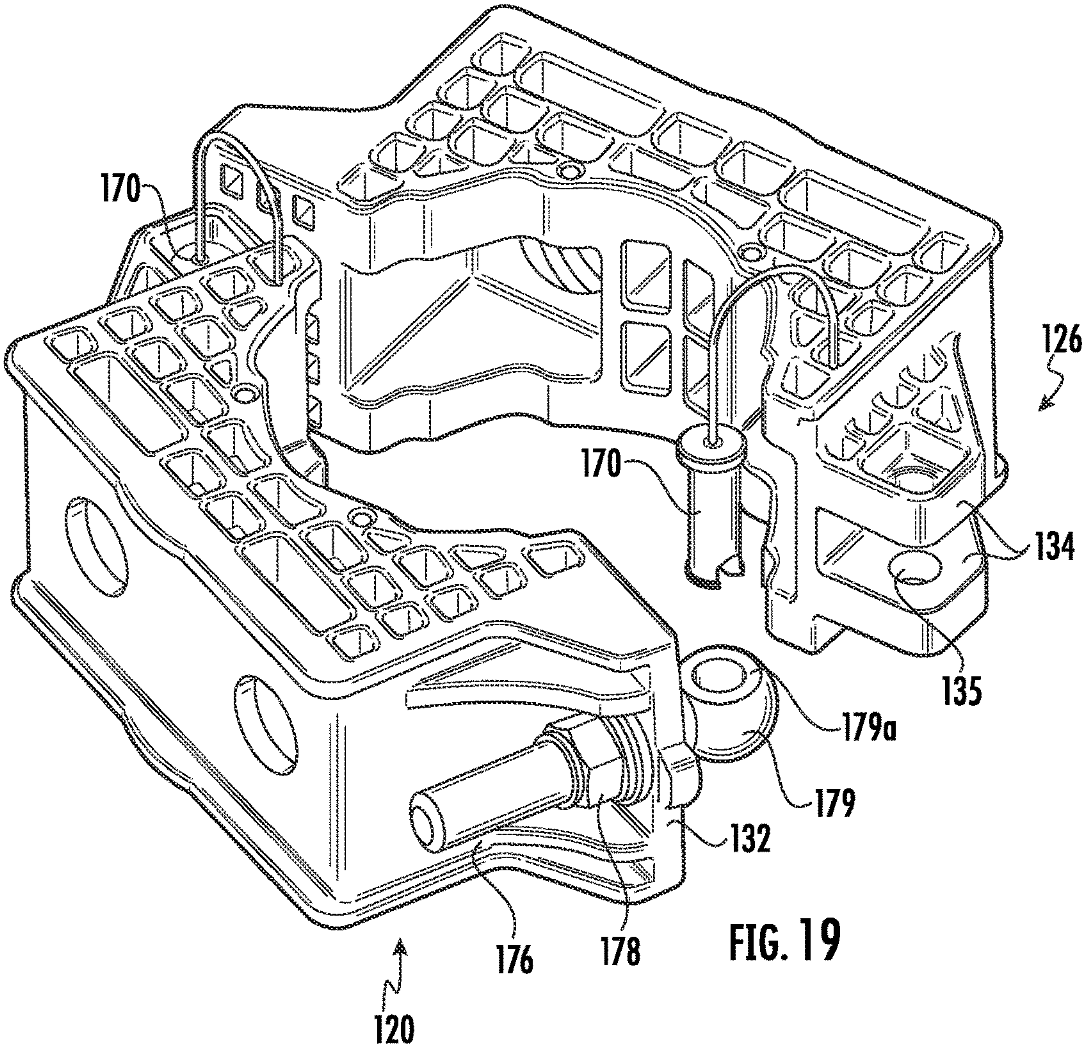
FIG. 19 is a perspective view of the assembly of FIG. 15 showing how the clamp pin and eyebolt are employed to secure the clamps of FIG. 15.
Figure 20:
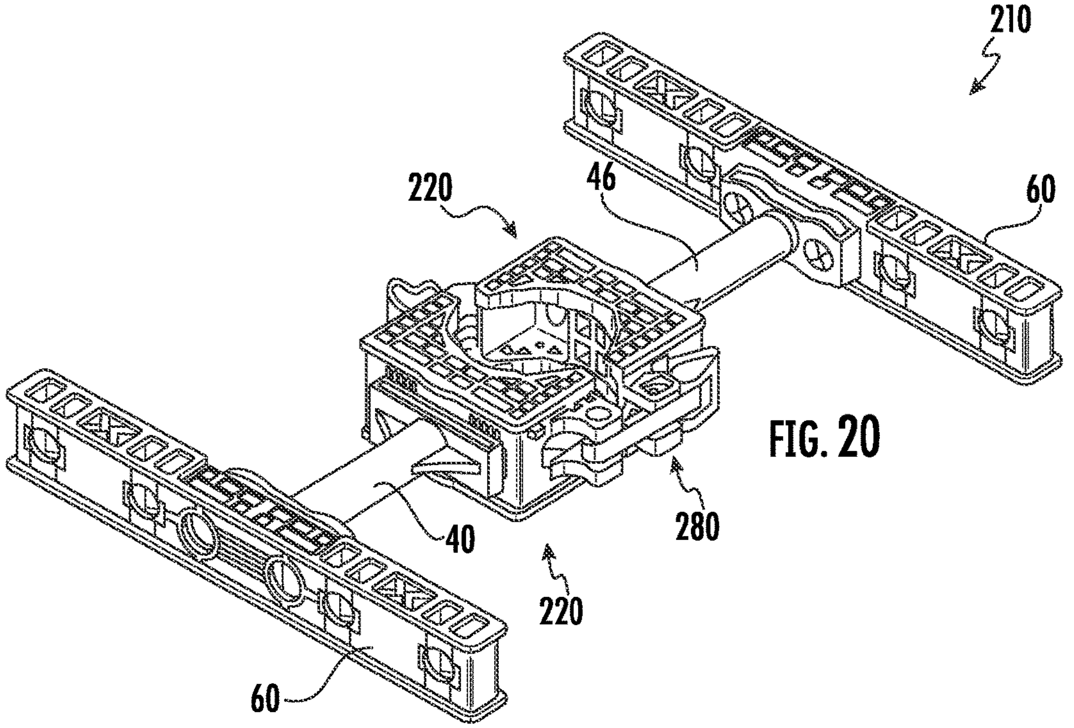
FIG. 20 is a perspective view of an assembly according to further embodiments of the invention.
Figure 21A:
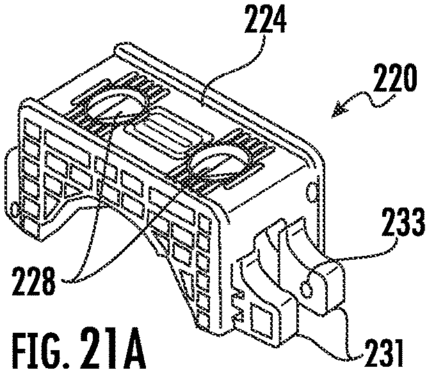
FIGS. 21A-21D are perspective views of one of the clamps of the assembly of FIG. 20.
Figure 21B:
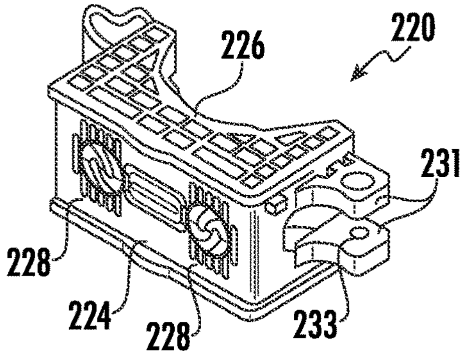
Figure 21C:
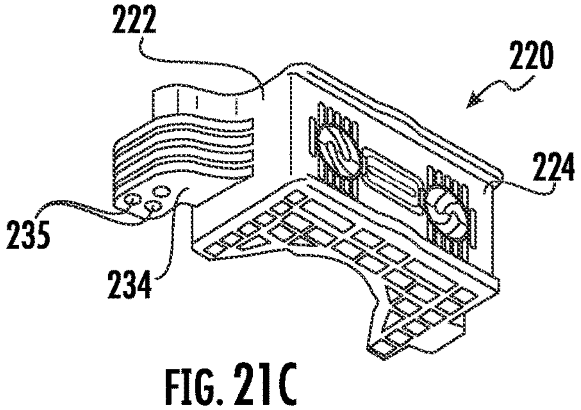
Figure 21D:
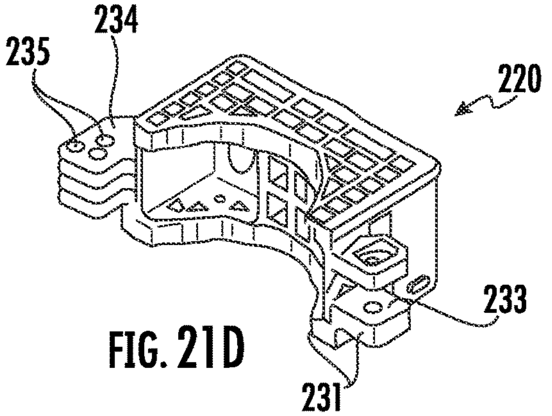

When the clamps 120 are to be attached to a mounting pole 14, the technician may begin by inserting both clamp pins 170 as described above. The clips 175 can be used to clip the clamp pins 170 to the clamps 120 to prevent them from getting lost. The assembly 110 can be brought to the mounting pole 14, one of the clamp pins 170 can be removed from the eye bolt 176 (as in FIG. 19), and the clamps 120 may be opened to receive the mounting pole 14. The clamps 120 can then be clamped onto the mounting pole 14 and the clamp pin 170 can be replaced. The clamps 120 can be tightened by tightening one or both of the hex nuts 178. As shown in FIG. 18, one or more washers 179*b* may be included between the hex nut 178 and the platform 132.

Referring now to FIGS. 20-23, another assembly, designated broadly at 210, is shown therein. The assembly 210 includes adapter extensions 40 and hanger panels 60 like those of the assemblies 10, 110, but utilizes clamps 220 that are configured to be secured together differently than the clamps 20, 120. As shown in FIGS. 21A-21D, each clamp 220 has a body 222, an outer surface 224 with mounting holes 228, and clamp surfaces 226 like the clamp 20. However, on one side of the body 222 the clamp 220 has two flanges 231, each with a mounting hole 233, and on the opposite side of the body 222 the clamp 220 has four wings 234, each with three mounting holes 235 arranged in a triangular pattern.

FIGS. 22A through 22C illustrate the components of a separate latch 280 used to attach the clamps 220 together. A latch link 281 has a triangular head 282 at one end with a hole 283, and also has a hole 284 at the opposite end. A latch lever 285 is generally U-shaped, with the arms 286 of the "U" being triangular with a rounded end 287. Holes 288 are present in the arms 286. A latch pin 289 has a shaft 290, hooks 291 at one end of the shaft 290, and a collar 292 at the opposite end.

To secure the clamps 220 together, the wings 234 of the clamps 220 are interleaved, and a latch pin 289 is inserted through one of the "columns" of mounting holes 235 in each clamp 220 (wherein the pattern of holes 235 provides some flexibility to accommodate mounting poles of different diameters). The latch link 281 is fastened to the flanges 231 of one of the clamps 220 via another latch pin 289 inserted through the holes 233 in the flanges and the hole 283 in the head of the latch link 281. The latch lever 285 is attached to the opposite end of the latch link 281 with a third latch pin 289, which is inserted through the holes 288 in the latch lever arms 286 and the hole 284 in the latch link 281. When the assembly 210 is mounted to a mounting pole 14, the latch link 281 is pivoted so that the latch lever 285 engages the flanges 231 on the other clamp 220, and the latch lever 285 is then pivoted so that its rounded ends 287 engage rounded surfaces of the flanges 231 to lock the latch 280 in place.

Referring now to FIGS. 24-33, another assembly, designated broadly at 310, is illustrated therein Like the prior discussed assemblies, the assembly 310 includes two clamps 320, an adapter extension 340, and hanger panels 360, albeit of somewhat different configurations. Also, the assembly 310 may include a mounting adapter 380 to facilitate mounting of the adapter extension 340 and/or the hanger panel 360. All of these components are discussed in greater detail below.

Figure 24:
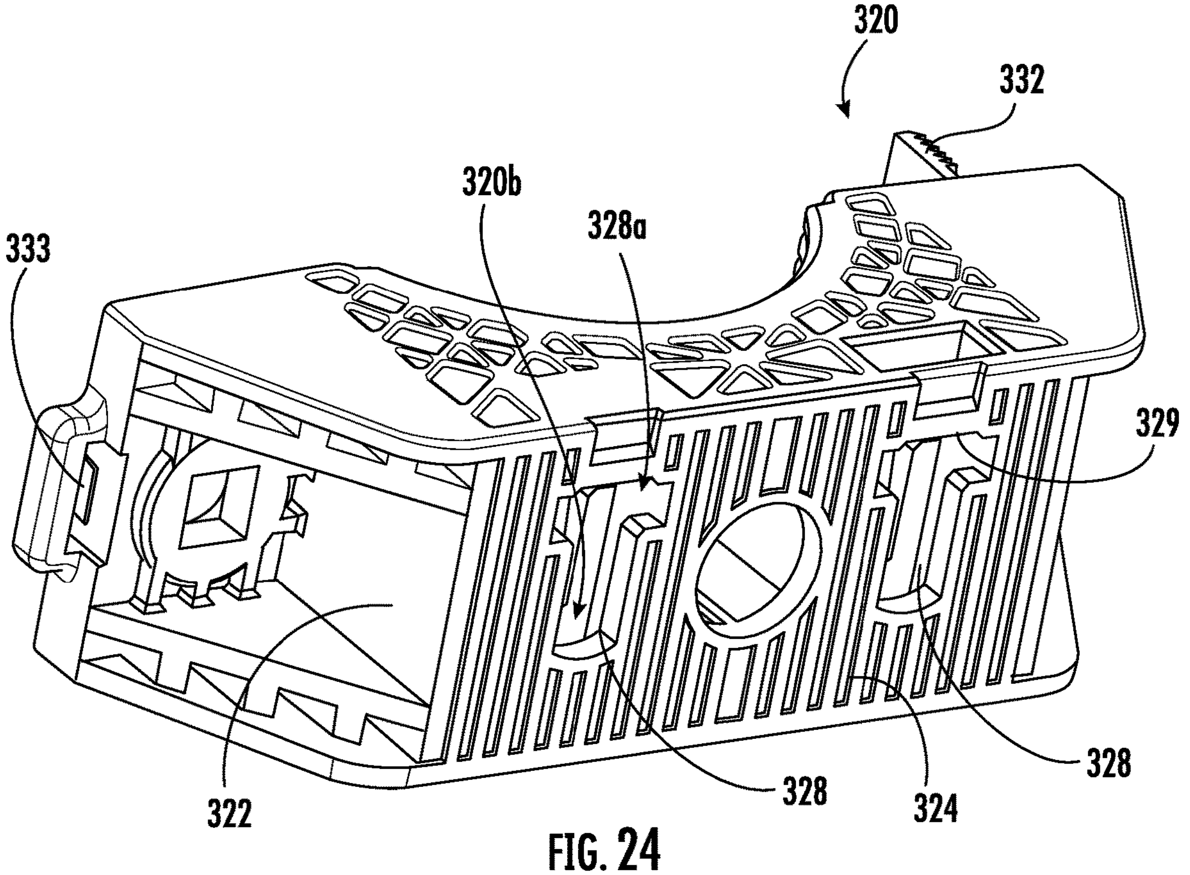
FIG. 24 is a front perspective view of a clamp of an assembly (shown in FIG. 32) for mounting cables according to further embodiments of the invention.
Figure 25:
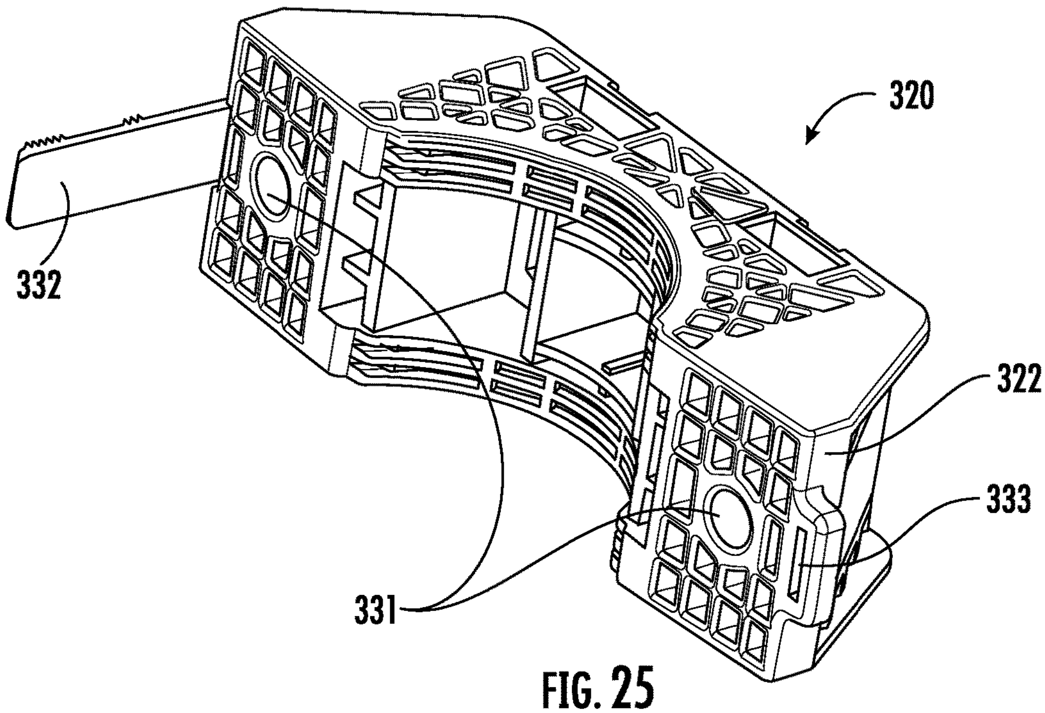
FIG. 25 is a rear perspective view of the clamp of FIG. 24.

Referring to FIGS. 24 and 25, the clamp 320 has a body 322, an outer surface 324 with mounting openings 328, and clamp surfaces 326 like the clamp 20. However, the mounting openings 328 are "T-shaped" openings, with an upper horizontal section 328*a* and lower vertical section 328*b* (see also FIG. 33A). Also, a shoulder 329 is present above each mounting opening 328, and an internal lower rim 333 is present in the vertical section 328*b*. Holes 331 extend through the body 322 on each side to receive a carriage bolt or the like (see FIG. 34). At one end, the clamp 320 includes a strap 332 that extends away from the outer surface 326, and at the opposite end the clamp 320 includes a loop 333 that is configured to receive the strap 332 from a second mating clamp 320.

Figure 26:
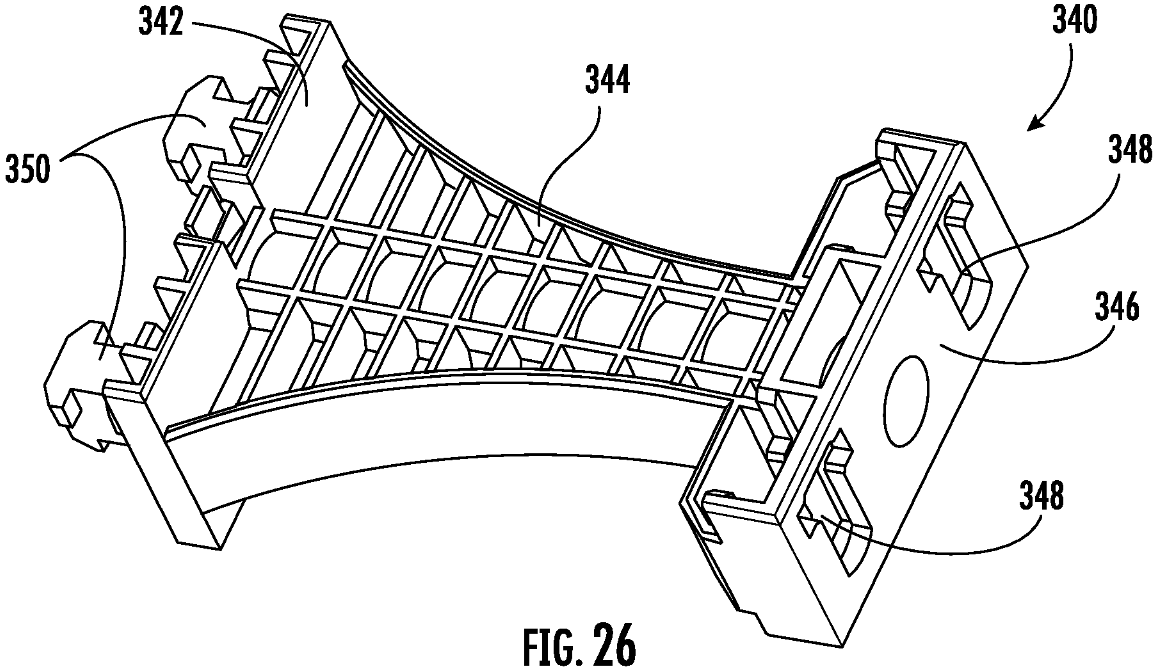
FIG. 26 is a front perspective view of an adapter extension of the assembly of FIG. 32.
Figure 27:
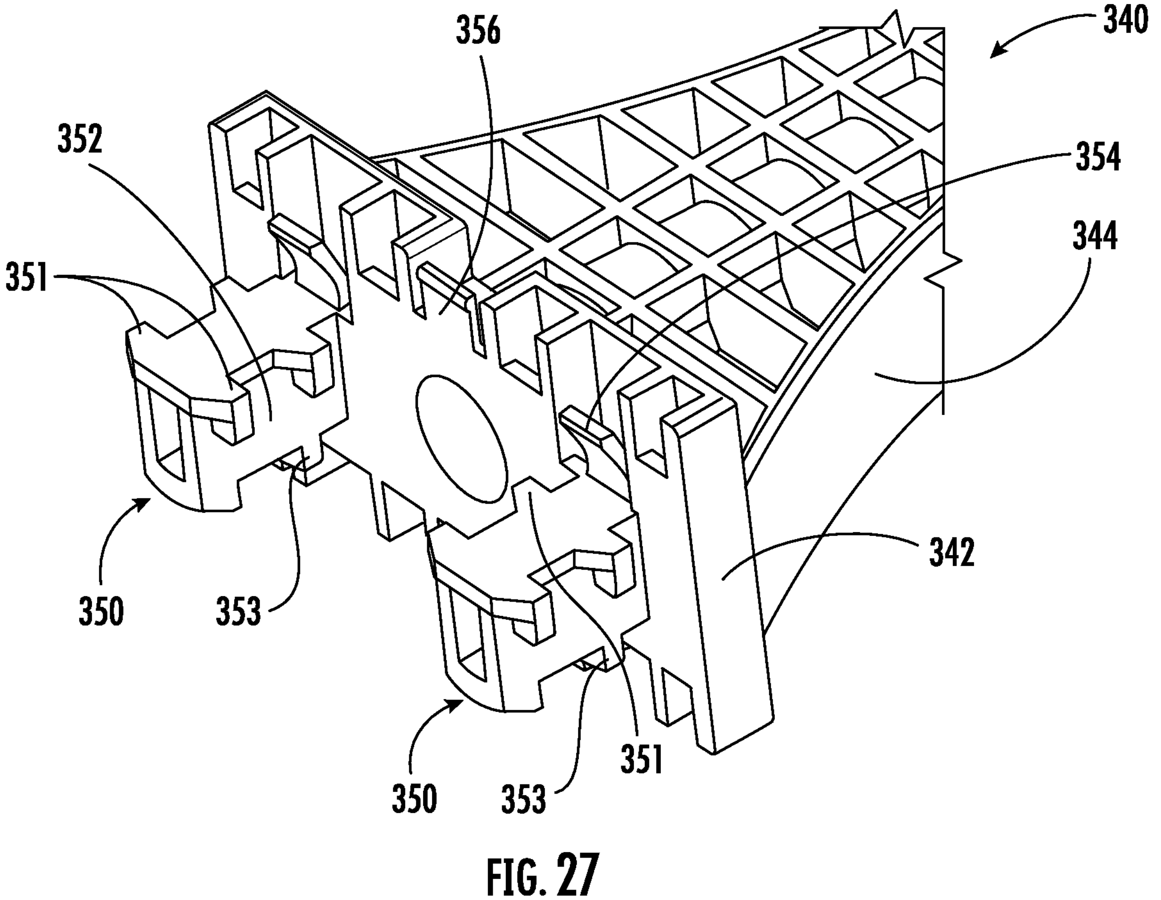
FIG. 27 is a rear perspective view of the adapter extension of FIG. 26.

Referring now to FIGS. 26 and 27, the adapter extension 340 has a base 342 and a head 346 that is generally parallel with the base 342 like the adapter 40, but these components are connected by a tapering body 344 that extends from the base 342 to the head 346. The head 346 includes two T-shaped openings 348 that are similar in shape to the T-shaped openings 328 of the clamp 320. At the opposite end of the adapter extension 340, two latches 350 extend away from the base 342. The body 352 of each latch 350 is generally rectangular in cross-section. Wings 351 extend laterally from the body 352. The wings 351 and body 352 are sized and configured to fit into the T-shaped openings 328 on the base 320, with the body 352 being shorter in height than the T-shaped opening 328. A lower lip 353 depends from the lower surface of the body 352. In addition, a curved finger 354 extends upwardly from the body 352 and slightly rearwardly away from the tapering body 344, and a support member 356 extends upwardly between the T-shaped latches 350.

Figure 28:
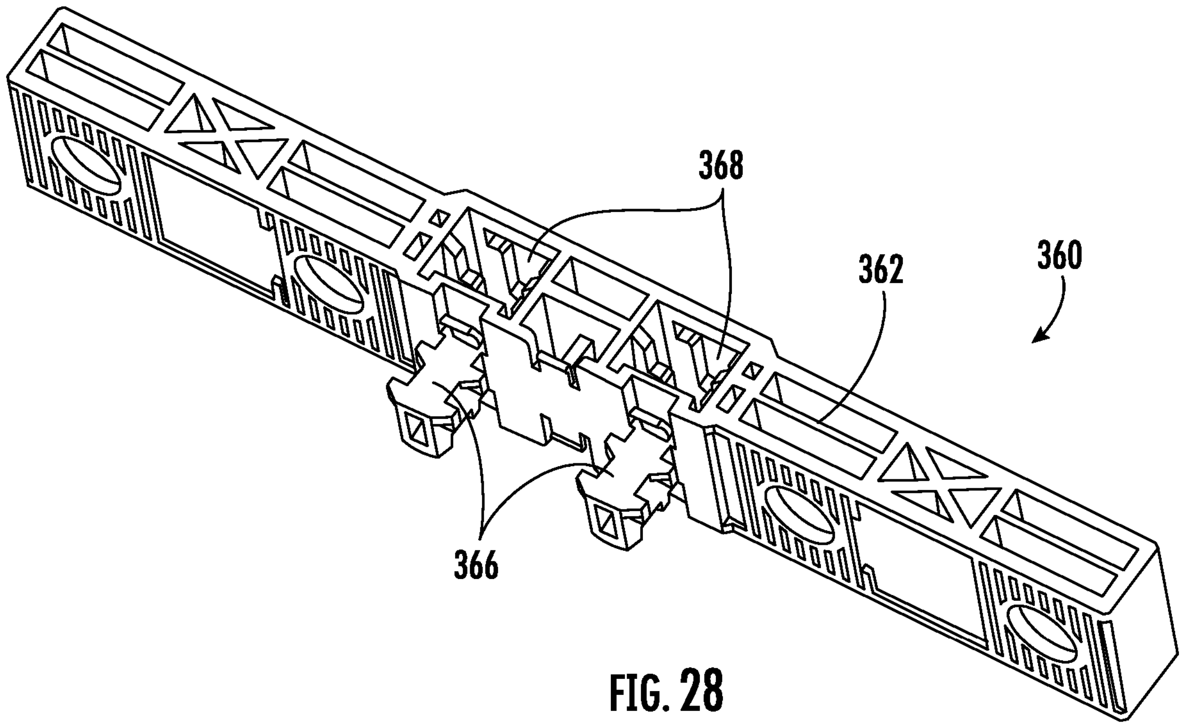
FIG. 28 is a rear perspective view of a hanger panel of the assembly of FIG. 32.
Figure 29:
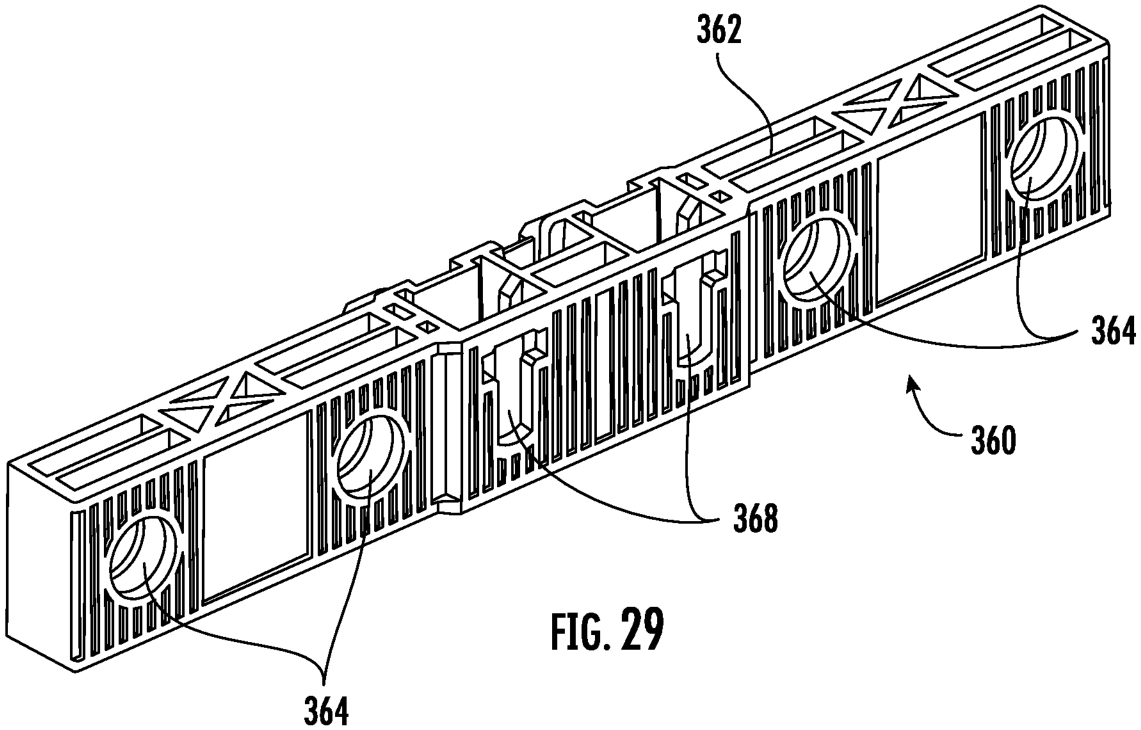
FIG. 29 is a front perspective view of the hanger panel of FIG. 28.

Referring now to FIGS. 28 and 29, the hanger panel 360 is similar to the hanger panel 60, with a generally rectangular skeletal base 362 and four mounting holes 364 (typically having a nominal diameter of ¾ inch) are spaced across both the front and rear surfaces of the base 362. Two T-shaped latches 366 extend from the rear surface of the base 362; the latches 366 are similar to the latches 348 described above and are sized and positioned to fit within the T-shaped openings 348 of the adapter extension 340 or the or the T-shaped openings 328 in the clamp 320. On its front surface, the base 362 has two T-shaped openings 368 that are sized and configured to receive T-shaped latches from the mounting adapter 380 (described below).

Figure 30:
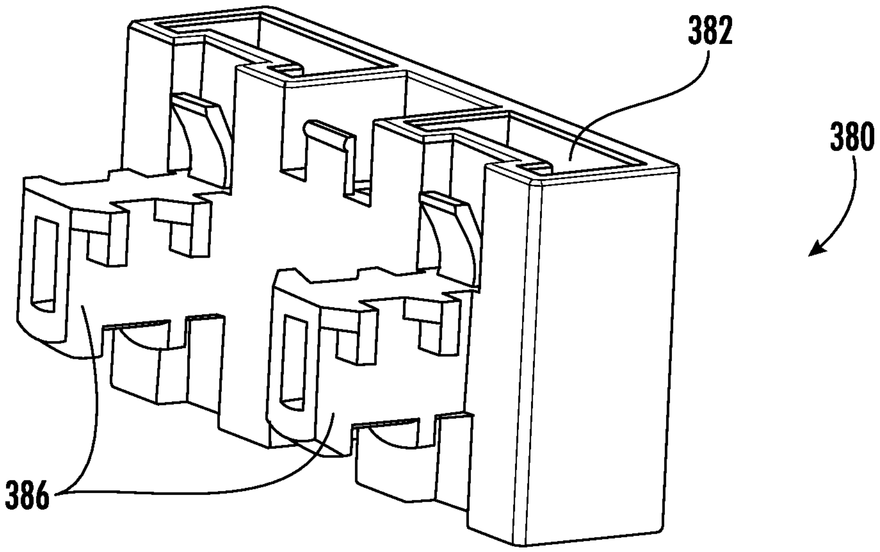
FIG. 30 is a rear perspective view of a mounting adapter of the assembly of FIG. 32.
Figure 31:
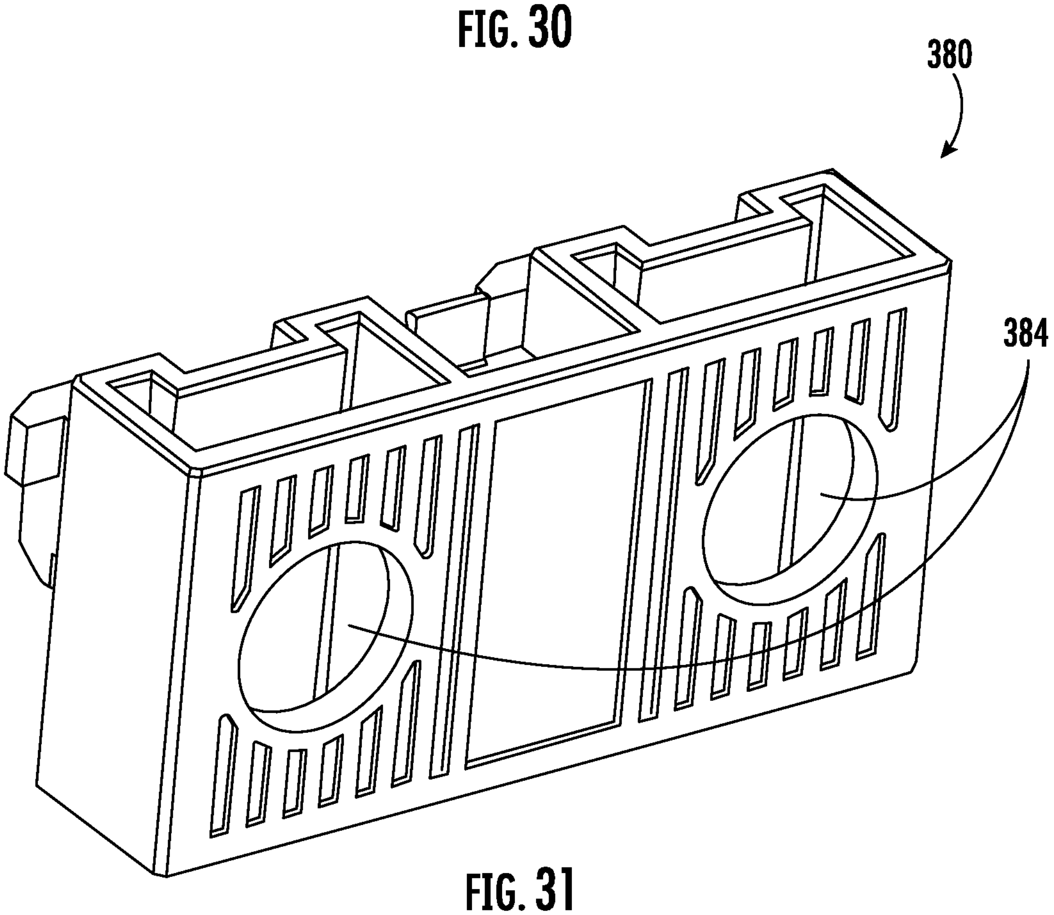
FIG. 31 is a front perspective view of the mounting adapter of FIG. 24.

Referring now to FIGS. 30 and 31, the mounting adapter 380 is generally rectangular with a skeletal base 382 and mounting holes 384 (typically nominally ¾ inch in diameter) on the front surface of the base 382. Two T-shaped latches 386 extend rearwardly from the base 382.

Figure 32:
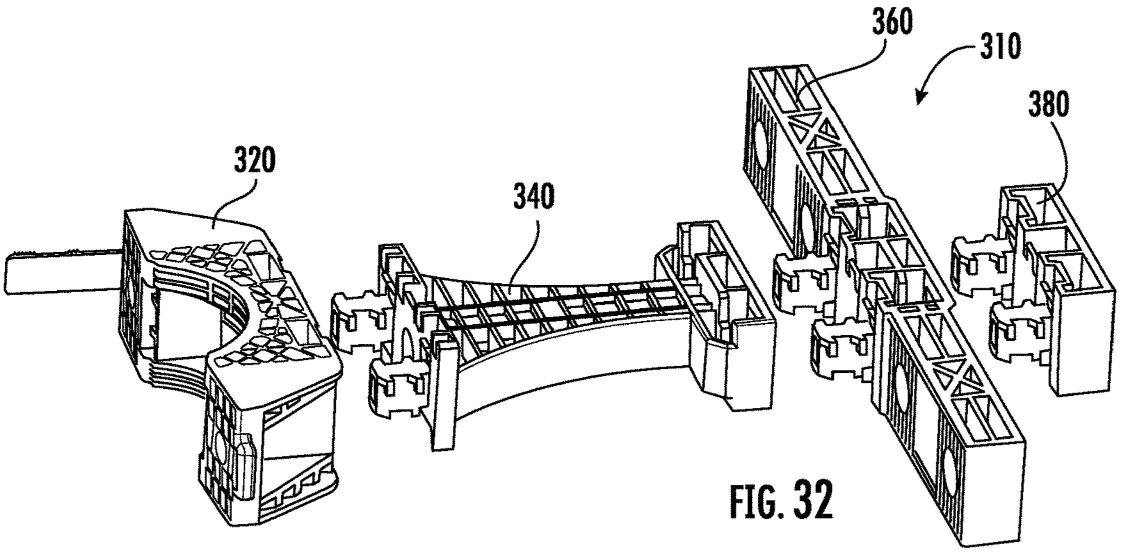
FIG. 32 is an exploded view of an assembly for mounting cables according to further embodiments of the invention.

FIG. 32 illustrates one particular configuration for the assembly 310. In this configuration, the adapter extension 340 is mounted to the clamp 320 via the T-shaped latches 350, which are inserted into the T-shaped openings 328 in the clamp 320 (details of the mounting of any of various T-shaped latches in any of the T-shaped openings are set forth below). The hanger panel 360 is mounted to the head 346 of the adapter extension 340 via the insertion of the T-shaped latches 366 into the T-shaped openings 348. The mounting adapter 380 is mounted to the hanger panel 360 via insertion of the T-shaped latches 386 into the T-shaped openings 368. In this configuration, the hanger panel 360 and the mounting adapter 380 provide mounting locations (in the form of the mounting holes 364 and 384) for cable hangers) similar to that shown in FIG. 12 above, but with additional mounting locations provided by the mounting holes 384 of the mounting adapter 380. In some embodiments, the assembly 310 may omit the mounting adapter 380, in which case the assembly 310 provides the same number of mounting locations as that shown in FIG. 12.

Figure 10:
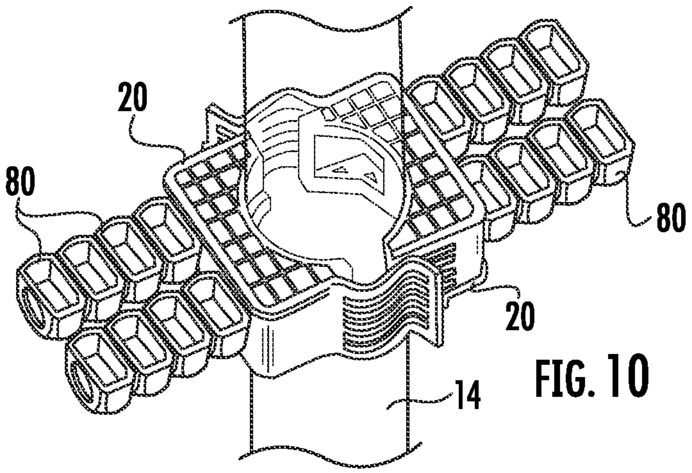
FIGS. 10-12 are perspective views of the assemblies of FIGS. 5, 7 and 9 with cable hangers mounted thereon.

Those skilled in this art will appreciate that the arrangements shown in FIGS. 10 and 11 can also be achieved with the assembly 310. More specially, the arrangement shown in FIG. 10 can be created by mounting the mounting adapter 380 directly onto the clamp 320 (with the T-shaped latches 386 being inserted into the T-shaped openings 328). The arrangement shown in FIG. 11 can be achieved by mounting the hanger panel 360 directly onto the clamp 320, (with the T-shaped latches 366 being inserted into the T-shaped openings 328). This arrangement may be augmented by the mounting of the mounting adapter 380 onto the hanger panel 360.

Figure 33A:
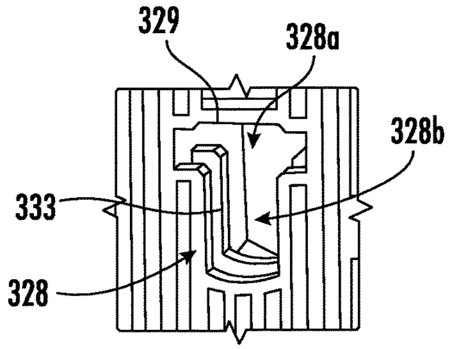
FIG. 33A is a front perspective view of a T-shaped opening in the clamp of FIG. 24.
Figure 33B:
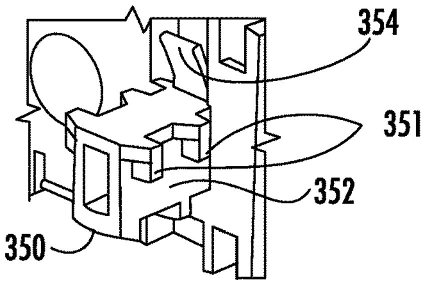
FIG. 33B is a rear perspective view of a T-shaped latch of the adapter extension of FIG. 26.
Figure 33C:
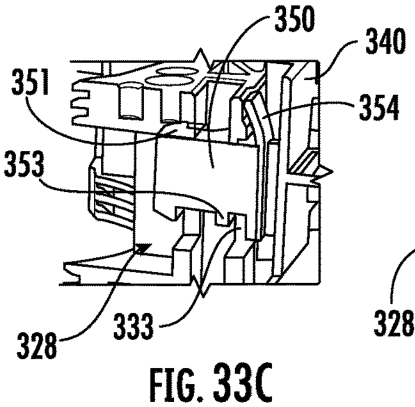
FIGS. 33C-33E are sequential section views showing the insertion of the latch of FIB. 33B into the opening of FIG. 33A.
Figure 33D:
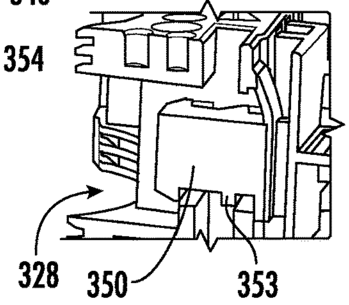

Referring now to FIGS. 33A-33E, the mounting of any of the T-shaped latches into any of the T-shaped openings is illustrated therein (using the T-shaped latch 350 and the T-shaped opening 328 as examples). As shown in FIG. 33C, the T-shaped latch 350 is inserted into the T-shaped opening 328, with the wings 351 slipping into the horizontal section 328*a* of the T-shaped opening 328 and the body 352 slipping into the vertical section 328*b*. Once the T-shaped latch 350 is fully inserted, it is lowered (see FIGS. 33D and 33E) until it "bottoms out" in the vertical section 328*b* of the T-shaped opening 328. In the position the wings 351 and the lower lip 353 of the T-shaped latch 350 have advanced rearwardly and downwardly sufficiently to capture the rim 333 and the rearward edge of the T-shaped opening 328 (see FIG. 33E).

Figure 33E:
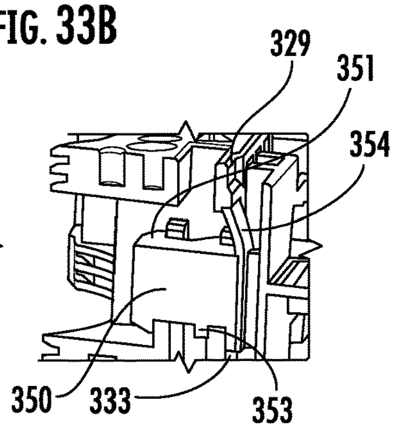
Figure 33F:
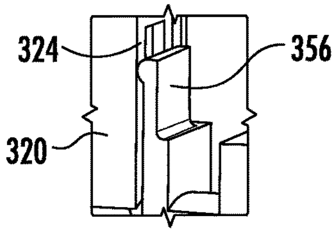
FIG. 33F is a partial view showing the support member of the adapter extension of FIG. 26 engaging the clamp of FIG. 24.

In addition, the finger 354 descends with the T-shaped latch 350 (flexing as it descends) until it reaches the shoulder 329, at which point it recovers partially from its deflection to fit within the shoulder 329 (see FIG. 33E). In this position, the finger 354 can provide rearward pressure to the clamp 320 to help "lock" the adapter extension 340 in place, and also provides a stop against upward movement of the adapter extension 340 relative to the clamp 320. The support member 356 also applies further rearwardly-directed pressure against the outer surface of the clamp 320 (see FIG. 33F).

Figure 34:
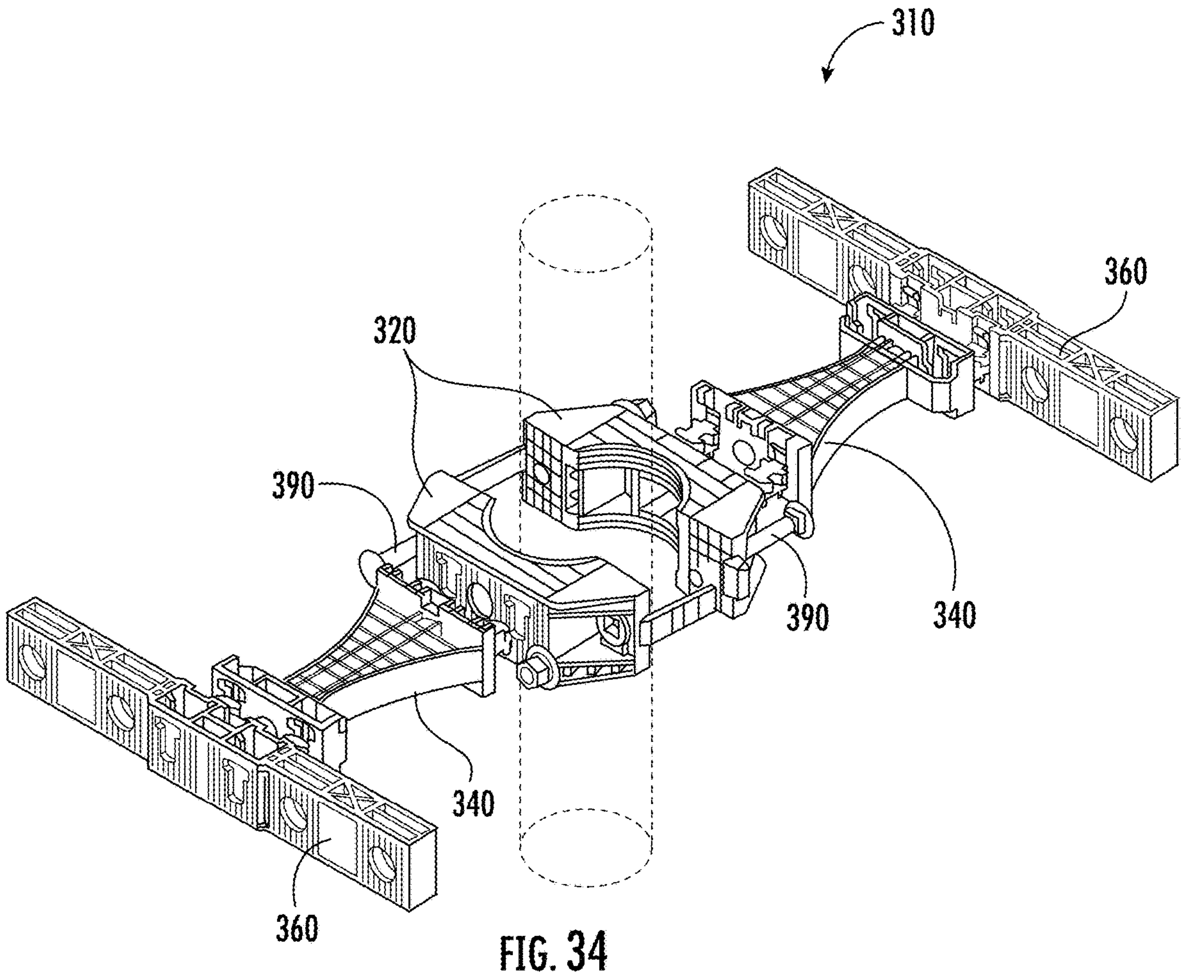
FIG. 34 is a partially exploded view of two assemblies of FIG. 32 (without the mounting adapters) being brought together to mount on a mounting structure (such as a mounting pole).

As shown in FIG. 34, two clamps 320 can be attached to a mounting pole (shown in broken line in FIG. 34) via carriage bolts 390 or other fasteners that are inserted into holes 331. Straps 332 are inserted into loops 333 on each side of the clamps 320 to assist with alignment during mounting and/or to provide additional stability.

Figure 39:
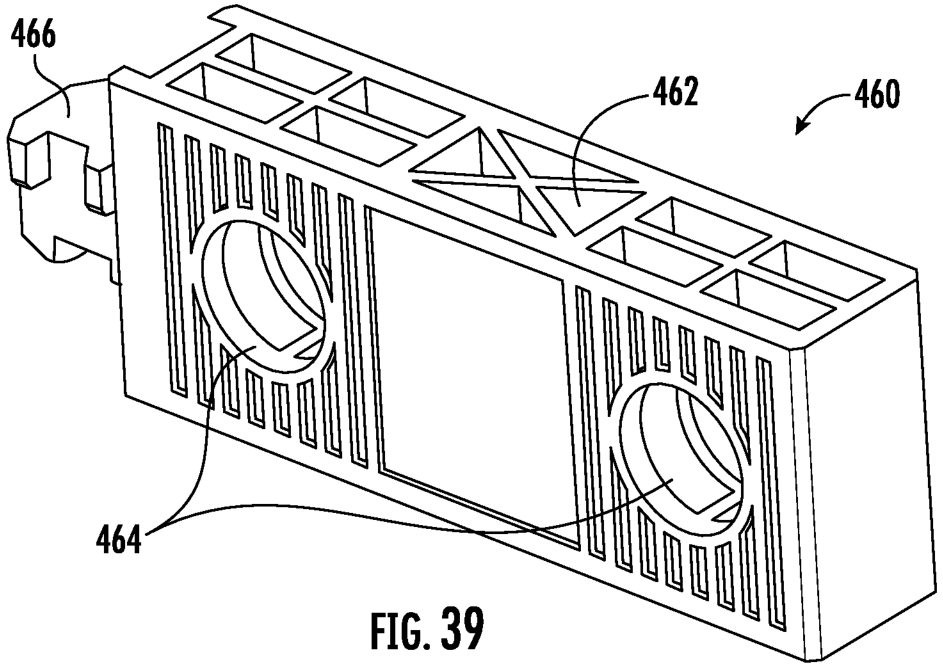
FIG. 39 is a front perspective view of a hanger panel according to additional embodiments of the invention.
Figure 40:
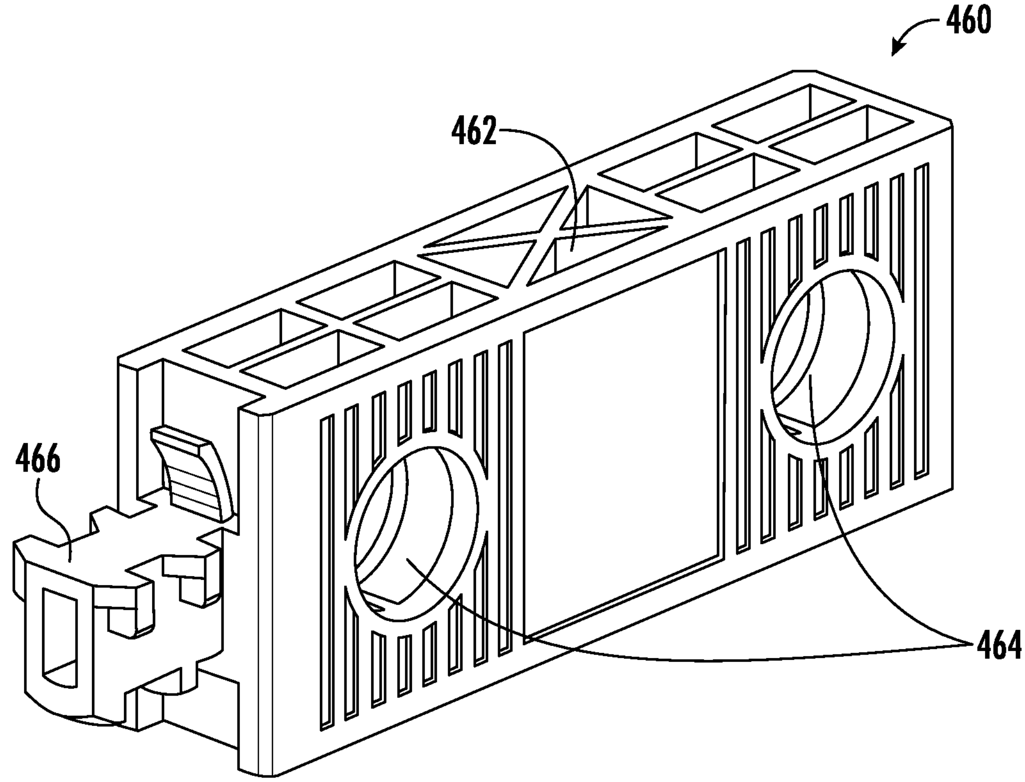
FIG. 40 is a rear perspective view of the hanger panel of FIG. 39.
Figure 41:
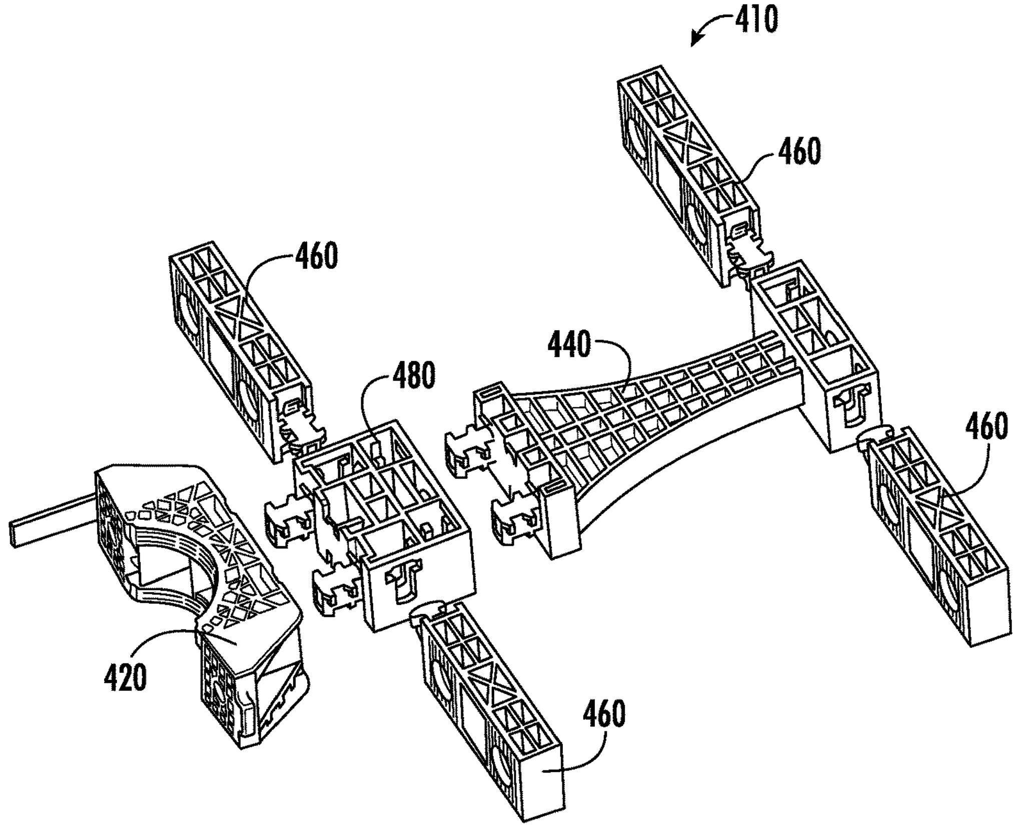
FIG. 41 is an exploded perspective view of an assembly that includes a clamp, the mounting adapter of FIG. 35, the adapter extension of FIG. 37, and four of the hanger panels of FIG. 39.
Figure 42:
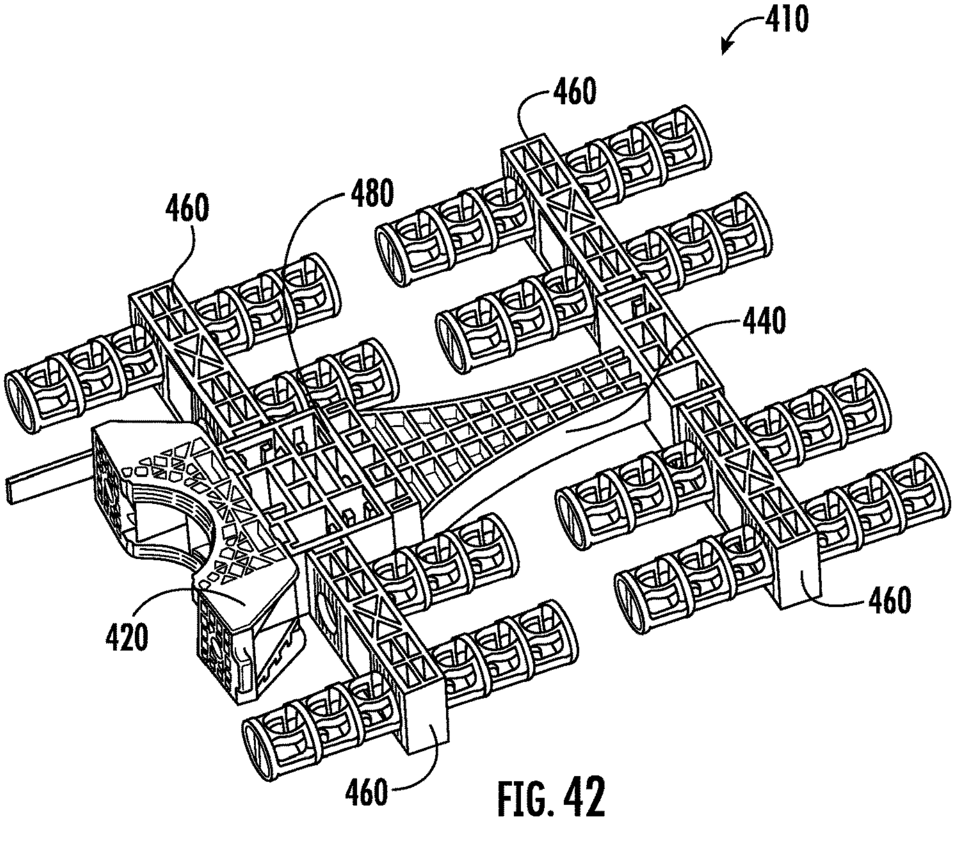
FIG. 42 is a perspective view of the assembly of FIG. 41.

Referring now to FIGS. 35-42, another assembly, designated broadly at 410, is illustrated therein. Like the prior discussed assembly, the assembly 410 includes two clamps 420 (only one of which is shown in FIGS. 41 and 42), an adapter extension 440, hanger panels 460, and a mounting adapter 480, albeit of somewhat different configurations (with the exception of the clamps 420, which are the same as the clamps 320). The other components are discussed in greater detail below.

Figure 35:
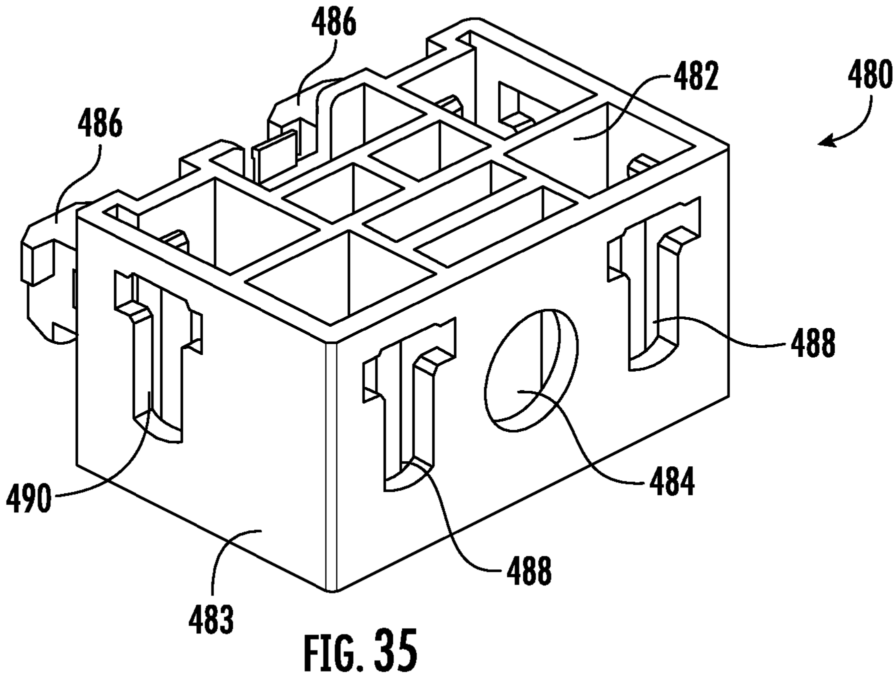
FIG. 35 is a front perspective view of a mounting adapter according to additional embodiments of the invention.
Figure 36:
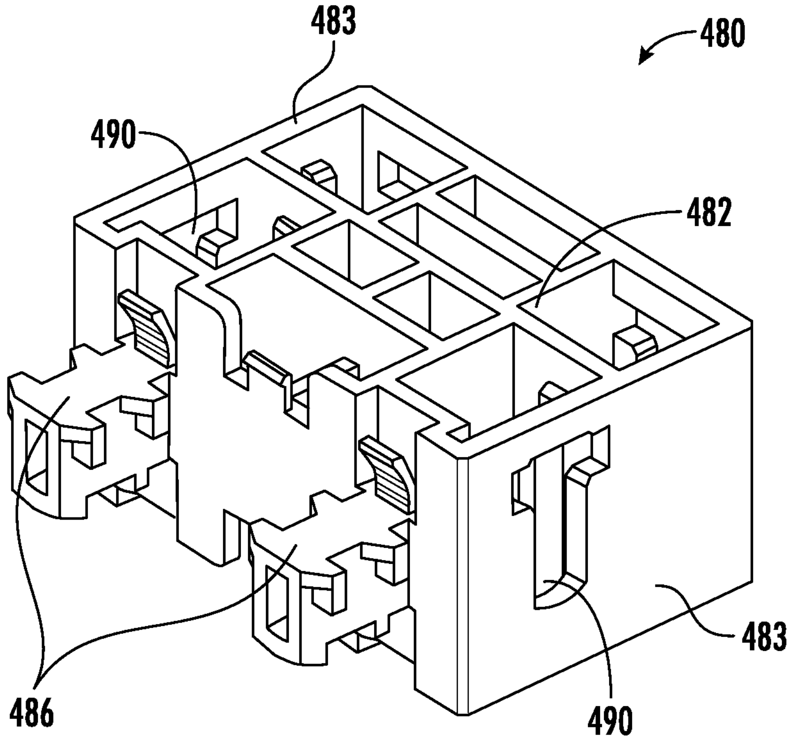
FIG. 36 is a rear perspective view of the mounting adapter of FIG. 35.

Referring to FIGS. 35 and 36, the mounting adapter 480 is generally rectangular with a skeletal base 482 and one mounting hole 484 (typically nominally ¾ inch in diameter) on the front surface of the base 482. Two T-shaped latches 486 similar to those described above extend rearwardly from the base 482. The mounting adapter 480 includes T-shaped openings 488 on its front surface on either side of the mounting hole 484. The mounting adapter 480 further includes a T-shaped opening 490 on each side wall 483.

Figure 37:
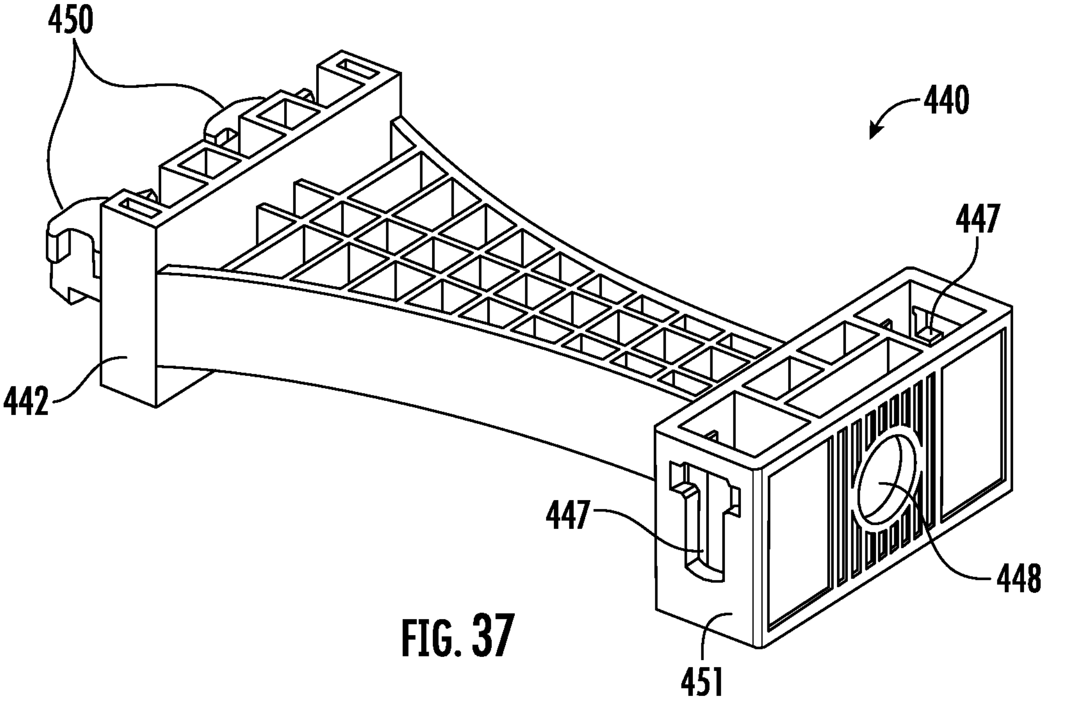
FIG. 37 is a front perspective view of an adapter extension according to additional embodiments of the invention.
Figure 38:
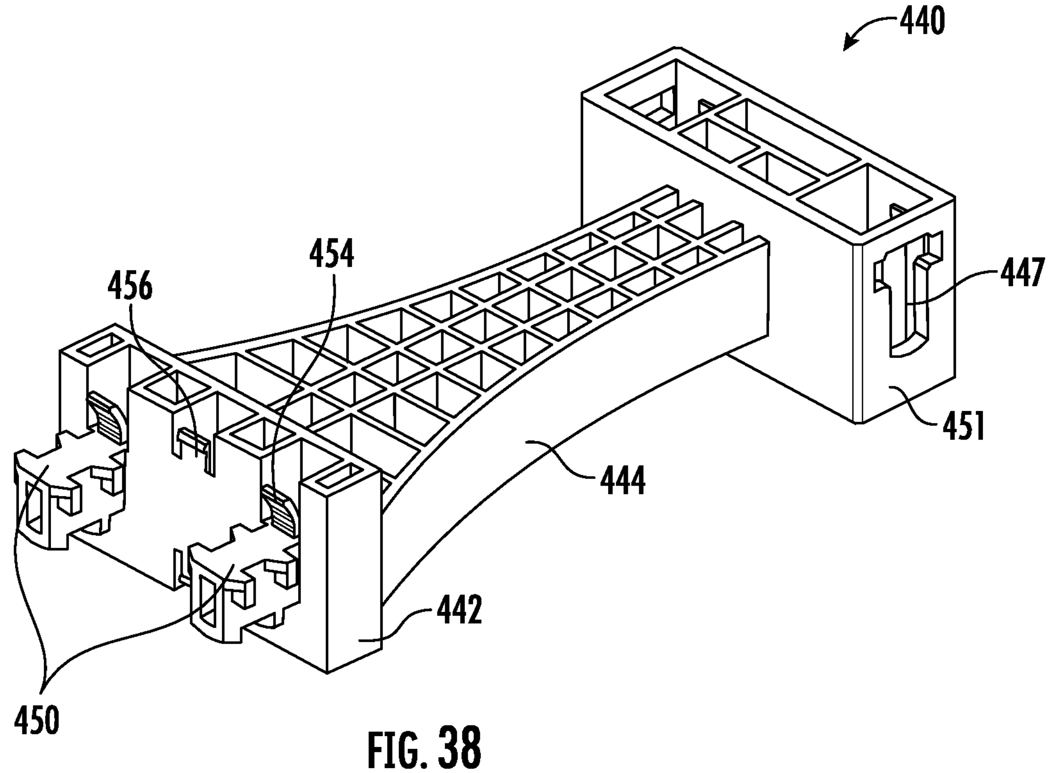
FIG. 38 is a rear perspective view of the adapter extension of FIG. 37.

Referring now to FIGS. 37 and 38, the adapter extension 440 has a base 442 and a head 446 that is generally parallel with the base 442, and a tapering body 444 that extends from 8the base 442 to the head 446. The head 446 includes a mounting hole 448 on its front surface and two T-shaped openings 447 (one on each side wall 451). At the opposite end of the adapter extension 440, two T-shaped latches 450 similar to those described above extend away from the base 442. The adapter extension 440 also includes a curved finger 454 and a support member 456 similar to those described above.

Referring now to FIGS. 39 and 40, the hanger panel 460 has a generally rectangular skeletal base 462 and two mounting holes 464 (typically having a nominal diameter of ¾ inch) on each of the front and rear surfaces of the base 462. A T-shaped latch 466 similar to those described above extends from the side surface 463 of the base 462.

One arrangement of the assembly 410 is shown in FIGS. 41 and 42. In this arrangement, the mounting adapter 480 is mounted onto the clamp 420 via the T-shaped latches 486 being inserted into the T-shaped openings in the clamp 420.

The adapter extension 440 is mounted to the mounting adapter 480 via the T-shaped latches 450 being inserted into the T-shaped openings 488. One or more hanger panels 460 can then be mounted onto the side surfaces of either (or both) of the mounting adapter 480 and the head 446 of the adapter extension 440; the T-shaped latches 466 are inserted into the T-shaped openings 447, 488; as shown in FIGS. 41 and 42, the hanger panels 460 can be mounted on both sides of the adapter extension 440 and/or the mounting adapter 480. Cable hangers can then be mounted on the mounting holes 464 on the front and rear surface of the hanger panels 460 as well as in the mounting hole 484 in the adapter extension 440.

Those of skill in this art will appreciate that the assembly 410 may omit the adapter extension 440, in which case the hanger panels 460 can be mounted on the mounting adapter 480 only. In another embodiment, the mounting adapter 480 may be omitted, such that hanger panels 460 are mounted only on the adapter extension 440.

In a further embodiment, it can be conceived that the clamp 420 and the mounting adapter 480 may be formed as an integral unit.

Notably, all of the clamps 20, 120, 220, 320, 420 are configured so that they can be used with an identical mating clamp 20, 120, 220, 320. This can reduce tooling costs and labor in manufacturing as well as simplifying assembly.

It will be understood by those of skill in this art that the assemblies 110, 210, 310, 410 can be used to create any of the configurations of adapter extensions and hanger panels shown in FIGS. 6-12.

It should also be apparent that any of the assemblies 110, 210, 310, 410 may be provided as a kit, which may include the clamp and one or more of the mounting adapter, the hanger panel(s), and the adapter extension.

It will also be apparent to those of skill in this art that other configurations of securing features for securing the clamps to a mounting pole or other mounting structure beyond those shown herein may be employed. One clamp should have a first securing feature (exemplified, but not limited to, the latch 30, the clamp pin 170, the latch 280, and the carriage bolt 390) and the other clamp should have a second securing feature (exemplified, but not limited to, the fingers 32, the eye bolt 176, the flanges 231, and a nut for the carriage bolt 390) that engages the first securing feature to maintain the clamps in a secured condition. Other potential features include latches, flanges, fingers and the like of different configurations, tongue-in-groove configurations, sliding rails and channels, and the like. It may be desirable with any of these configurations that the securing features be configured so that the clamps may be secured on mounting poles of different diameters.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A cable mounting kit, comprising:

first and second clamps, the first clamp including a first securing feature configured to engage a second securing feature on the second clamp to enable the first and second clamps to enclose and mount on a mounting structure, each of the first and second clamps including a clamping surface configured to engage the mounting structure and an opposed outer surface with a pair of first mounting openings; and at least one cable hanger mounting component selected from:

a hanger panel, the hanger panel having a first plurality of cable hanger mounting holes on an outer surface thereof and a first pair of latches, the first pair of latches being receivable within the first mounting openings;

at least one adapter extension, the adapter extension comprising a base having a second pair of latches being receivable within the first mounting openings, a member extending from the base, and a head with a pair of second mounting openings; and a mounting adapter having a third set of latches receivable within the first mounting openings or the second mounting openings, the mounting adapter including at least one second cable hanger mounting hole;

wherein the first pair of latches is also receivable within the second mounting openings.

2. The cable mounting kit defined in claim 1, wherein the first and second clamps, the at least one hanger panel, the adapter extension and the mounting adapter are formed of a polymeric material.

3. The cable mounting kit defined in claim 1, further comprising a plurality of cable hangers.

4. The cable mounting kit defined in claim 1, wherein the first and second mounting holes have a nominal diameter of ¾ inch.

5. The cable mounting kit defined in claim 1, wherein the first and second clamps are identical.

6. The cable mounting kit defined in claim 1, wherein the mounting adapter includes a plurality of third mounting openings, and wherein the first, second and third mounting openings are substantially identical.

7. The cable mounting kit defined in claim 1, wherein the at least one cable hanger mounting component is the mounting adapter, and wherein the mounting adapter is mounted directly to the first clamp.

8. The cable mounting kit defined in claim 1, wherein the at least one cable hanger mounting component is the hanger panel, and wherein the hanger panel is mounted directly to the first clamp.

9. The cable mounting kit defined in claim 8, wherein the at least one cable hanger mounting component further includes the mounting adapter, and wherein the mounting adapter is mounted directly to the hanger panel.

10. The cable mounting kit defined in claim 1, wherein the at least one cable hanger mounting component is the adapter extension, and wherein the adapter extension is mounted directly to the first clamp.

11. The cable mounting kit defined in claim 10, wherein the at least one cable hanger mounting component further comprises the hanger panel, wherein the hanger panel is mounted directly to the adapter extension.

12. The cable mounting kit defined in claim 11, wherein the at least on cable hanger mounting component further comprises the mounting adapter, wherein the mounting adapter is mounted directly to the hanger panel.

13. The cable mounting kit defined in claim 1, wherein the first mounting openings and the second mounting openings are T-shaped.

14. The cable mounting kit defined in claim 13, wherein the hanger panel includes a plurality of third mounting openings, and wherein the third mounting openings are T-shaped.

15. The cable mounting kit defined in claim 1, wherein the second mounting openings are located on opposing side surfaces of the adapter extension, and the third mounting openings are located on opposing side surfaces of the mounting adapter.

16. A cable mounting kit, comprising:

first and second clamps, the first clamp including a first securing feature and the second clamp including a second securing feature, the first and second securing features facilitating the first and second clamps enclosing and mounting on a mounting structure, each of the first and second clamps including a clamping surface configured to engage the mounting structure and an opposed outer surface with a pair of first mounting openings; and at least one cable hanger mounting component selected from:

a hanger panel, the hanger panel having a first plurality of cable hanger mounting holes on an outer surface thereof and a first pair of latches, the first pair of latches being receivable within the first mounting openings;

at least one adapter extension, the adapter extension comprising a base having a second pair of latches being receivable within the first mounting openings, a member extending from the base, and a head with a pair of second mounting openings; and a mounting adapter having a third set of latches receivable within the first mounting openings or the second mounting openings, the mounting adapter including at least one second cable hanger mounting hole;

wherein the first pair of latches is also receivable within the second mounting openings.

17. The cable mounting kit defined in claim 16, wherein the first and second clamps, the at least one hanger panel, the adapter extension and the mounting adapter are formed of a polymeric material.

18. The cable mounting kit defined in claim 16, further comprising a plurality of cable hangers.

19. The cable mounting kit defined in claim 16, wherein the first and second mounting holes have a nominal diameter of ¾ inch.

20. The cable mounting kit defined in claim 16, wherein the first and second clamps are identical.

21. The cable mounting kit defined in claim 16, wherein the mounting adapter includes a plurality of third mounting openings, and wherein the first, second and third mounting openings are substantially identical.

22. The cable mounting kit defined in claim 16, wherein the at least one cable hanger mounting component is the mounting adapter, and wherein the mounting adapter is mounted directly to the first clamp.

23. The cable mounting kit defined in claim 16, wherein the at least one cable hanger mounting component is the hanger panel, and wherein the hanger panel is mounted directly to the first clamp.

24. The cable mounting kit defined in claim 23, wherein the at least one cable hanger mounting component further includes the mounting adapter, and wherein the mounting adapter is mounted directly to the hanger panel.

25. The cable mounting kit defined in claim 16, wherein the at least one cable hanger mounting component is the adapter extension, and wherein the adapter extension is mounted directly to the first clamp.

26. The cable mounting kit defined in claim 25, wherein the at least one cable hanger mounting component further comprises the hanger panel, wherein the hanger panel is mounted directly to the adapter extension.

27. The cable mounting kit defined in claim 26, wherein the at least on cable hanger mounting component further comprises the mounting adapter, wherein the mounting adapter is mounted directly to the hanger panel.

28. The cable mounting kit defined in claim 16, wherein the first mounting openings and the second mounting openings are T-shaped.

29. The cable mounting kit defined in claim 28, wherein the hanger panel includes a plurality of third mounting openings, and wherein the third mounting openings are T-shaped.

30. The cable mounting kit defined in claim 16, wherein the second mounting openings are located on opposing side surfaces of the adapter extension, and the third mounting openings are located on opposing side surfaces of the mounting adapter.

31. The cable mounting kit defined in claim 11, wherein the mounting adapter is horizontally disposed.

32. The cable mounting kit defined in claim 12, wherein the mounting adapter is horizontally disposed.

33. The cable mounting kit defined in claim 23, wherein the hanger panel is horizontally disposed.

34. The cable mounting kit defined in claim 24, wherein the hanger panel is horizontally disposed.

* * * * *